(12) United States Patent
Russo et al.

(10) Patent No.: US 11,600,072 B2
(45) Date of Patent: Mar. 7, 2023

(54) OBJECT LEFT BEHIND DETECTION

(71) Applicant: AVIGILON CORPORATION, Vancouver (CA)

(72) Inventors: Pietro Russo, Melrose, MA (US); Mahesh Saptharishi, Boston, MA (US); Peter L. Venetianer, Mclean, VA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 253 days.

(21) Appl. No.: 16/709,201

(22) Filed: Dec. 10, 2019

(65) Prior Publication Data

US 2020/0193166 A1 Jun. 18, 2020

Related U.S. Application Data

(60) Provisional application No. 62/778,581, filed on Dec. 12, 2018.

(51) Int. Cl.
*G06V 20/52* (2022.01)
*G06T 7/194* (2017.01)
(Continued)

(52) U.S. Cl.
CPC .............. *G06V 20/52* (2022.01); *G06T 7/194* (2017.01); *G08B 21/24* (2013.01); *G06T 7/254* (2017.01);
(Continued)

(58) Field of Classification Search
CPC ..................... G06T 7/194; G06T 7/254; G06T 2207/10028; G06T 2207/30196;
(Continued)

(56) References Cited

U.S. PATENT DOCUMENTS 4,006,459 A 2/1977 Baker et al.
6,526,678 B2 3/2003 Waddington, Jr. et al.
(Continued)

FOREIGN PATENT DOCUMENTS

JP 2006-338535 A 12/2006
WO 2018/064764 A1 4/2018
WO WO-2018198373 A1 * 11/2018 ............... G06T 7/20

OTHER PUBLICATIONS

Smith et al., "Detecting abandoned luggage items in a public space", IDIAP (Year: 2006).*

(Continued)

*Primary Examiner* — Kenny A Cese
(74) *Attorney, Agent, or Firm* — Daniel R. Bestor

(57) ABSTRACT

Techniques for automatically detecting objects left behind. An example method includes receiving video frames of a scene from a three-dimensional (3D) camera and establishing, based on 3D depths associated with the video frames, a background of the scene. The method also includes detecting, in the frames, a foreground blob in the scene based on the foreground blob having a 3D depth that is different from the background. The method further includes detecting that the foreground blob has separated into a blob corresponding to a person and a second blob corresponding to an object, based on the person having a 3D depth that is different from the object. The method additionally includes determining that the person has been separated from the object for a threshold, and responsive to determining that the person has been separated from the object for the threshold, generating an alert indicating that the object is left behind.

19 Claims, 9 Drawing Sheets

(51) Int. Cl.
  *G08B 21/24* (2006.01)
  *G08B 13/196* (2006.01)
  *G06T 7/254* (2017.01)
  *G06V 10/50* (2022.01)
(52) U.S. Cl.
  CPC ............... *G06T 2207/10028* (2013.01); *G06T 2207/30196* (2013.01); *G06T 2207/30232* (2013.01); *G06T 2207/30242* (2013.01); *G06V 10/50* (2022.01); *G08B 13/196* (2013.01)
(58) Field of Classification Search
  CPC .......... G06T 2207/30242; G06T 2207/30232; G08B 21/24; G08B 13/196; G06K 9/4642; G06K 9/00771; G06V 20/52; G06V 10/50
  See application file for complete search history.

(56) References Cited

U.S. PATENT DOCUMENTS

| | | | |
|---|---|---|---|
| 6,999,600 | B2 | 2/2006 | Venetianer et al. |
| 8,675,917 | B2 | 3/2014 | Brown et al. |
| 8,711,217 | B2 | 4/2014 | Venetianer et al. |
| 2008/0100704 | A1* | 5/2008 | Venetianer ......... G06F 16/7854 348/143 |
| 2008/0247599 | A1* | 10/2008 | Porikli ............... G06K 9/00771 382/103 |
| 2009/0304230 | A1* | 12/2009 | Krahnstoever ......... G06T 7/292 382/103 |
| 2010/0131442 | A1* | 5/2010 | Sheu ................ G08B 13/19604 706/46 |
| 2012/0183177 | A1* | 7/2012 | Ku .......................... G06T 7/155 382/103 |
| 2013/0182114 | A1* | 7/2013 | Zhang .................. A61B 5/1072 348/150 |
| 2014/0139629 | A1* | 5/2014 | Baiyya ................ H04N 13/204 348/46 |
| 2017/0323458 | A1 | 11/2017 | Lablans |
| 2020/0043174 | A1* | 2/2020 | Togashi .................... G06T 7/20 |

OTHER PUBLICATIONS

Yang et al., "Surveillance system using abandoned object detection", Proceedings of the 12th International Conference on Computer Systems and Technologies, pp. 380-386. (Year: 2011).*
Borkar et al., "Real time abandoned bag detection using OpenCV" Int. J. Sci. Eng. Res, 4, p. 660 (Year: 2013).*
International Search Report and Written Opinion dated Mar. 17, 2020 for International Application No. PCT/CA2019/051781 (Authorized Officer, Kodjo Glakpe), 11 pages.
Chen et al., "Exploring Depth Information for Head Detection with Depth Images", IEEE AVSS 2016, Aug. 2016, Colorado Springs, CO, USA, pp. 228-234.
Martinez-del-Rincon et al., "Automatic Left Luggage Detection and Tracking Using Multi-Camera UKF", Proceeding 9th IEEE International Workshop on PETS, New York, Jun. 18, 2006, pp. 59-66.
Aralia Systems Ltd., "3d Camera—Aralia System Ltd", Aug. 10, 2018, "https://www.araliasystems.com/3d-cmera/", 8 pages.

* cited by examiner

OBJECT LEFT BEHIND DETECTION

CROSS-REFERENCE TO RELATED APPLICATIONS

This application claims priority to U.S. provisional application 62/778,581 filed 12 Dec. 2018, the entire contents of which are hereby incorporated by reference in their entirety.

FIELD OF THE INVENTION

The present disclosure generally relates to detecting objects left behind, and more particularly, to methods and systems for using three-dimensional (3D) cameras and person tracking to detect objects left behind.

BACKGROUND

Challenges exist when attempting to accurately and automatically detect objects left behind in busy environments (such as, for example, airport terminals, banks, schools, retail locations, or busy public spaces). Object Left Behind detection (i.e., abandoned object detection) can be a challenging problem to solve. Detecting objects left behind in a scene is not easy with traditional computer vision methods or presently known deep learning methods. The main problem is detecting an object has been introduced into a crowded scene and detecting the owner has abandoned it. The type of the object or degree of congestion in the scene may confuse traditional methods. The color of the object or type of object may confuse traditional methods.

Accordingly, it is desirable to provide improved systems, methods and techniques for automatically detecting objects left behind.

SUMMARY

Disclosed herein are systems, methods, and computer program products for detecting objects left behind using 3D camera images and person tracking. In various implementations, the systems, methods, and computer program products use one or more three-dimensional (3D) cameras mounted top down (for example, mounted in or on a ceiling with an approximately vertical downward-facing field of view) to accurately segment new objects from a background of an area being monitored (for example, a room). The systems, methods, and computer program products perform person tracking (for example, detecting and tracking persons) to determine if an owner of an object has moved sufficiently away from the object to classify the object as being left behind (for example, abandoned or forgotten) in an automated fashion. In some implementations, the 3D cameras can include an active stereo camera, such as, for example, the RealSense™ Depth Camera D435 from Intel Corporation. In additional or alternative implementations, the 3D cameras can include one or more of a Time-of-Flight camera, a Structured Light camera, a stereoscopic camera (both passive and active) and variants such as, for example, a trinocular camera. According to certain implementations, other 3D sensors can be used, such as, for example 3D ultrasound, 3D radar, 3D millimeter wave (mmWave), and 3D LiDAR.

In additional or alternative implementations, one or more 3D cameras do not have to be mounted top down. For example, such implementations can use one or more 3D cameras that are mounted in an area of a room (for example, a corner) being monitored so as to increase a Field of View (FoV) of the camera. These implementations can use modified algorithms to accommodate a greater chance of occlusion and angled views that can coincide with the use of a corner-mounted 3D camera. In some implementations, various techniques for tracking people and objects can be used. For example, Kalman filtering or a Conditional Density Propagation (Condensation) computer vision algorithm can be used to track detected objects in video frames. Also, for example, a template matching technique can be used to track moving objects (for example, people or vehicles) and stationary objects (such as, for example, objects that people have abandoned or left behind). As a further example, a multi-hypothesis Kalman tracker can be used to track objects.

In certain implementations, a technique for automated object left behind detection includes using a 3D camera mounted top down, and scanning a 3D background captured by the camera. According to such implementations, the technique calculates a difference between a foreground object and the background. The difference may be calculated based at least in part on baseline camera footage at a site captured before a detected object entered the site. The difference can be calculated based on background depth from a background scan that does not include objects of interest and a foreground that includes people and objects that were not present at time of the background scan. The difference between an object and the background can also be calculated based at least in part on comparing the distance of the object from a 3D video camera lens (for example, a 3D depth) to distances (for example, depths) of known background objects (for example, floor, countertops, desktops, shelves, and other surfaces). Next, in response to detecting a significant difference, a timer can be used to count a time duration or number of video frames where an object was present. In some implementations, if an object is present for a certain duration (such as, for example, present for 5 seconds), then an alert can be triggered. In this example, the technique detects if people were present in a scene using a person tracking code, and if persons are present, then no video frames are counted. Once there are no people in the FoV, the counter is incremented.

In various implementations, a computer implemented method automatically detects objects that have been left behind. The computer implemented method includes receiving, at a computing device, a plurality of video frames of a scene from a three-dimensional (3D) camera. The method further includes detecting, in the plurality of video frames and by the computing device, a foreground blob in the scene based on the foreground blob having a 3D depth that is different from the background. The method additionally includes detecting, in the plurality of video frames and by the computing device, a foreground blob in the scene based on the foreground blob having a 3D depth that is different from the background. The method also includes detecting, by the computing device, that the foreground blob has separated into at least two blobs, a first blob of the at least two blobs corresponding to a person and a second blob of the at least two blobs corresponding to an object, based on the person having a 3D depth that is different from the object. The method further includes determining, by the computing device, that the person has been separated from the object for a predetermined threshold; and in response to determining that the person has been separated from the object for the predetermined threshold, generating an alert indicating that the object has been left behind.

In some implementations, the method also includes displaying, on a display device, the alert.

In certain implementations, determining that the person has been separated from the object for the predetermined threshold includes: incrementing a timer; determining that the timer has reached a threshold time value; and in response to determining that the timer has reached the threshold, generating the alert indicating that the object has been left behind. In some such implementations, the threshold time value is a tunable numeric value representing a duration in seconds with a default value of 10.

According to some implementations, establishing the background of the scene includes recording respective 3D depths of a floor present in the scene and at least one persistent, stationary object present in the scene. In accordance with some such implementations, the foreground blob is a person plus object blob that has one or more 3D depths that are significantly different than the 3D depth of the floor and the 3D depth of the at least one persistent, stationary object present in the scene.

In other implementations, determining that the person has been separated from the object for the predetermined threshold comprises includes: determining, by the computing device, that the object is present in the scene for a certain duration; defining an exclusion zone around the object and within the scene; and determining, based at least in part on person tracking, that the person has left the exclusion zone. In some such implementations, the certain duration is a tunable numeric value representing a duration in seconds with a default value of 5. According to certain such implementations, the exclusion zone is a dynamically re-sizable area defined as a radius around the object. In certain such implementations, the radius is a tunable numeric value representing a distance in feet with a default value of 5.

In yet other implementations, the scene is a location being monitored by the 3D camera. According to some such implementations, the 3D camera is mounted on one of a ceiling or a wall at the location being monitored by the 3D camera. In other such implementations, the location being monitored is one or more of an airport, a transit station, a concert venue, a stadium, a prison, a casino, a factory, a government building, a school campus, a loading dock, and a retail store.

In various implementations, a system for automatically detecting objects that have been left behind includes one or more three-dimensional (3D) cameras; one or more processors; and a memory operably coupled to the one or more processors, the memory storing instructions, which when executed by the one or more processors, cause the one or more processors to perform operations. The operations include receiving a plurality of video frames of a scene from a three-dimensional (3D) camera. The operations further include establishing, based on 3D depths associated with the plurality of video frames, a background of the scene. The operations also include detecting, in the plurality of video frames, a foreground blob in the scene based on the foreground blob having a 3D depth that is different from the background. The operations additionally include detecting that the foreground blob has separated into at least two blobs, a first blob of the at least two blobs corresponding to a person and a second blob of the at least two blobs corresponding to an object, based on the person having a 3D depth that is different from the object. The operations also include determining that the person has been separated from the object for a predetermined threshold; and in response to determining that the person has been separated from the object for the predetermined threshold, generating an alert indicating that the object has been left behind.

In various implementations, a non-transitory computer-readable medium stores instructions which, when executed by one or more processors of a system, cause the system to perform operations. The operations include receiving a plurality of video frames of a scene from a three-dimensional (3D) camera. The operations also include establishing, based on 3D depths associated with the plurality of video frames, a background of the scene; and detecting, in the plurality of video frames, a foreground blob in the scene based on the foreground blob having a 3D depth that is different from the background. The operations further include detecting that the foreground blob has separated into at least two blobs, a first blob of the at least two blobs corresponding to a person and a second blob of the at least two blobs corresponding to an object, based on the person having a 3D depth that is different from the object. The operations additionally include determining that the person has been separated from the object for a predetermined threshold; and in response to determining that the person has been separated from the object for the predetermined threshold, generating an alert indicating that the object has been left behind.

BRIEF DESCRIPTION OF THE DRAWINGS

The accompanying drawings, which are incorporated into and constitute a part of this specification, illustrate example of implementations and together with the description, serves to explain the principles of the disclosure.

DETAILED DESCRIPTION

Figure 1:
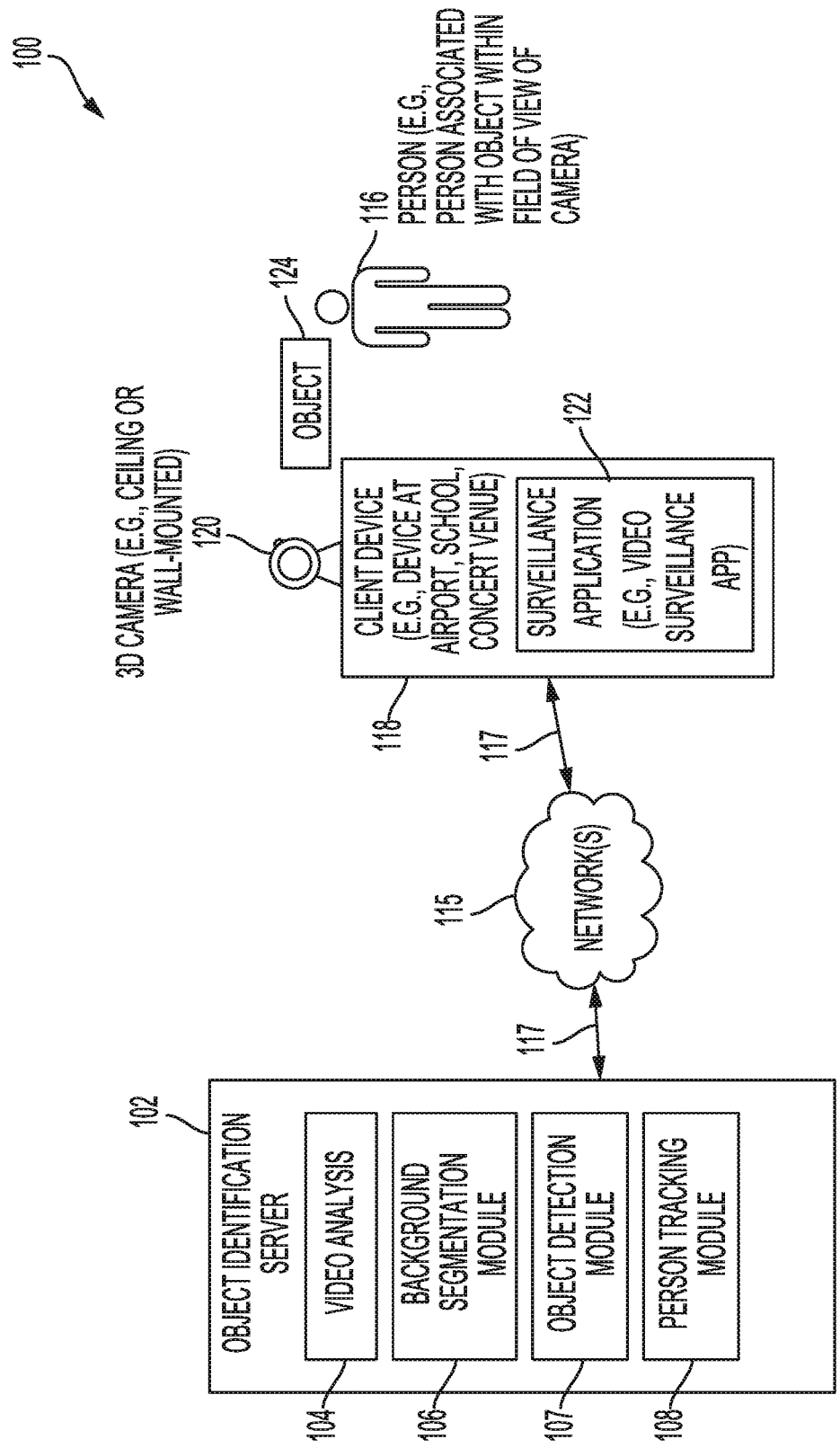
FIG. 1 is a block diagram illustrating an example of an operating environment for detecting objects left behind, according to examples of the present disclosure.

Reference will now be made in detail to exemplary implementations, examples of which are illustrated in the accompanying drawings. Wherever convenient, the same reference numbers will be used throughout the drawing to refer to the same or like parts.

Various implementations consistent with the disclosure provide systems, methods, and computer program products for or related to automated detection of objects that have been left behind. Example implementations relate to computer implemented methods, computerized systems, and computer program products for automatic detecting objects left behind using 3D depths in 3D camera images and person tracking.

Implementations consistent with the present disclosure provide novel systems, methods, and computer program products to automatically determine that a person has left behind an object by: establishing a background of a scene (for example, a location being monitored or surveilled with a 3D camera); detecting, based on 3D depths captured by the 3D camera, a significant difference in the scene (such as, for example, detecting a new foreground blob in the scene that is not part of the background); accurately segmenting the foreground blob into a person and an object that has volume; determining that the person has let go of or separated from the object; and determining, based on person tracking, that the person has left the object behind at the scene for an amount of time.

Implementations consistent with the present disclosure alleviate and/or solve various technical drawbacks of conventional systems that require subjective analysis by humans to manually analyze images and determine if an object has been left behind.

Traditional object left behind or abandoned object detection methods are based on 2D surveillance cameras. Such traditional methods do not work well in busy environments with many people and objects, and when the color of the object matches that of the background. Novel methods disclosed herein use a 3D camera to scan a scene and determine if any object that has volume has been introduced into the scene. Such a determination does not depend on the color and/or the shape of the object, as do conventional techniques. Instead, by using a 3D camera, the methods and systems described herein can detect an introduced object based at least in part on the object's distance from a 3D camera lens (for example, the object's depth when viewed from above as compared to the depths of other items in the field of view of the camera).

According to some implementations, a method for detecting objects left behind uses a 3D camera mounted top down to accurately segment new objects from the background. The data from the 3D camera alone, however, may not be sufficient for accurate determination that an object has been left behind because in some environments it may also be necessary to distinguish between a truly abandoned object and one where a person has intentionally set it down nearby.

By analyzing video frames captured by a 3D camera, various implementations can determine which person has "created" or introduced a new object in the scene when they separate from (for example, let go of) the object. Initially, in 3D space, the object will be part of a "person plus object" blob, and thus will not be considered a new object until it is separated from the person-plus-object blob.

Generally, a blob is any object in a video frame. As used herein, the term "foreground blob" refers to persons and/or objects that have entered a scene after creating a background model for the scene. Some implementations only focus on foreground blobs. As such, the terms "blob" and "foreground blob" are used interchangeably herein to refer to persons and/or objects in a video frame of a scene that entered the scene after a background model of the scene has been created. For instance, a blob (i.e., a foreground blob) can be any object that is not in the background. That is, blobs can be objects that are moving or have moved, and stationary objects would not be a blob. Examples of a blob include a moving object, such as a person or a vehicle. Stationary objects, such as a piece of furniture, a shelf, a counter, a floor, or other background objects are not generally classified as blobs. In various implementations, a 3D camera can be used to detect, based on 3D depths, a new foreground blob in a scene by differentiating the foreground blob from known background objects in a scene or location (such as, for example, a room or other physical area being monitored by a 3D camera). Such foreground blobs can include a moving object, such as a person, and an object associated with the moving object (for example, an object being carried by a person). Blobs can be defined or generated using detected objects from video frames. In some implementations, various techniques for generating blobs can be used. One example technique for generating blobs from motion detection and change detection uses a connected components scheme.

When a person sets an object down, a system processing data from a 3D camera can accurately segment the two and determine an object has been placed down, for example, by detecting a significant difference (for example, more than four feet) between the height of the top of the person's head (for example, the distance from a top mounted 3D camera to the top of the person's head) and the height of the top of the object after it has been set down. This determination alone may not be sufficient, as people regularly set items down intentionally (for example, it is expected that weary travelers will periodically set down their bags in environments such as airports and transit stations). Thus, various implementations also employ person tracking algorithms, such as an algorithm based on head tracking to track the head of a person with a detected height (for example, a detected 3D depth of the top of the person's head as measured by a top-mounted 3D camera). In certain implementations, Kalman filtering or a Condensation computer vision algorithm can be used to for head tracking. In some implementations, other person tracking or people tracking algorithms could be used that are based on blobs and their distances from a 3D camera lens (for example, depth), and these algorithms can also work using an angle view similar to the view obtained by wall-mounted and corner-mounted surveillance cameras. That is, certain implementations do not require a top down mounting of the 3D camera. Angle mounting can increase the coverage area for the 3D camera as compared to a top down, ceiling mounted 3D camera. While angle mounting may also increase likelihood for occlusions, with the use of the 3D depth detected by an angle-mounted 3D video camera, various implementations can use the distance from the camera to segment people and their objects from a background. In scenarios and implementations with ceilings that are higher than normally encountered in rooms (such as, for example, stadiums, concert venues, parts of airports, etc. with ceiling heights exceeding 12 feet), the people and objects will appear relatively smaller in the images from the 3D camera. By using the depth information and the expected height of people and the expected size or height of objects, various implementations can compensate for the smaller people and object images, and still have a functioning system that detects objects left behind by people.

By tracking people in the scene, various implementations can determine whether the person who set the object down has walked a sufficient distance away in order for the object to be classified as abandoned. In some implementations, a simple metric can be if the person has left the FoV of the 3D camera. According to an implementation, a method could also measure the distance between person and object and set a threshold in order to determine that the person has exited an exclusion zone (for example, a threshold radius around the object, such as, for instance, a radius of three feet, five feet, 10 feet, 15 feet, or any suitable amount).

By using a 3D camera (either ceiling or high wall-mounted), various implementations can determine 3D depth for foreground/background calculations. Based on the distance of a person (for example, a head of a person as viewed from a ceiling-mounted camera) from a 3D camera and the distance of an object from the 3D camera, certain implementations can determine when the person has put or placed the object down on a surface such as, for example a floor, desk, shelf, or countertop. Various implementations move beyond simply detecting people and objects by also performing person tracking, which enables the systems and methods described herein to actually measure the distance between the object's owner (for example, a tracked person) and the object, and compare the measured distance to a threshold distance in order to distinguish whether the person has walked sufficiently away from an object to consider it abandoned, or not.

In some implementations, detecting or determining that an object is left behind by a person includes defining an exclusion zone around the stationary object and alerting only if no object of interest (for example, a person) is inside the exclusion zone. That is, the exclusion zone may be defined such that there should be no people in the zone in order to label or identify the object as abandoned. The exclusion zone may also be defined so as to not contain a specific person (for example, a tracked person who introduced the object into a scene within the FoV of a camera) or to not contain an object of a certain type (for example, another moving object such as, for instance, a vehicle) in order to label the object as abandoned. For example, one way to establish an exclusion zone may be to specify that there should be no people in the exclusion zone, but there may be stationary objects, like a bag, laptop, luggage cart, shopping cart, or another object that was not left behind by that person. The exclusion zone may also have a time period associated with it so that an abandoned object alert is generated only if the exclusion zone has no person of interest (for example, the person who left the object in the exclusion zone) for a prescribed time. In this implementation, a person stepping away from a stationary object (for example, the person's bag) just briefly may still be allowed without triggering an abandoned object alert.

In various implementations, the exclusion zone may also have a time associated with it so that an alert is generated only if the exclusion zone has no object of interest (for example, a person who abandoned a stationary object) for a prescribed time period. The prescribed time can be measured in terms of elapsed time (for example, seconds or minutes) or in terms of a number of video frames in which the person (or object of interest) is absent. In this way, a person briefly stepping away from a stationary object, such as a piece of luggage or a briefcase, may not trigger a determination by the system that the stationary object has been abandoned or left behind by the person. Conversely, if an object of interest (for example, a person) is in the exclusion zone for only a brief period of time, such as when a person walks by an unattended bag, this can result in the system determining that the stationary object has been abandoned or left behind (for example, an abandoned object alert may still be generated).

According to various implementations, the size of the exclusion zone may be determined in multiple ways. In one example, using camera calibration information for the 3D camera, the exclusion zone may be defined as a shape with a fixed, real-world size around the object (for example, a roughly one-meter or 3 foot radius circle). In alternative implementations, other types of camera calibration may be used. For example, a user interacting with a user interface of the object left behind system (see, for example, the user interfaces of FIGS. 3 and 4) may specify a certain shape (such as, for example, a circle, an ellipse, a rectangle, or other suitable shape) for the exclusion zone in a near field of the 3D camera and a similar smaller shape (for example, of the same type of circle, ellipse or rectangle as the case may be) to account for the greater distance in the far field of the 3D camera, where the shapes indicate the exclusion zone for an object near the camera and far away from the camera, respectively. This may be done via a user interface and may be done, for example, graphically (for example, via an interactive graphical user interface (GUI) that permits a user to graphically superimpose shapes on video images) or by entering parameters (such as, for example, shape, size, dimensions, etc. of the exclusion zone).

The object left behind system may then interpolate and extrapolate the exclusion zone for every point in the image from the near field and far field shapes. Such interpolation and extrapolation may be simple linear interpolation, or it can comprise more complex types of interpolation and/or extrapolation. The interpolation and/or extrapolation may also reflect more complex 3D camera projection models (for example, a quadratic model). The size of the exclusion zone may also be adjusted dynamically, depending on factors like the density of a crowd in the scene (for example, a smaller exclusion zone for a larger crowd at a concert venue or stadium event) or a security threat level (for example, a smaller exclusion zone for higher threat levels at an airport or a security checkpoint). The dynamically resizable exclusion zone can be defined in combination with either of the above-described fixed-size techniques. In such a combination, a fixed size exclusion zone may be defined as the base size, and that exclusion zone size may be dynamically increased or decreased according to the scenario and the site being monitored (such as, for example, an airport, school, bank, transit station, aircraft interior, bus interior, stadium, prison, casino, factory, government building, a campus, loading dock, retail store, or arena).

In additional or alternative implementations, a method includes capturing, with a 3D camera, all of the people in the scene when a non-background object has been discovered by the algorithm and then waiting for all of the people to leave the 3D camera's FoV before the object is considered abandoned. In some such implementations, new people who subsequently enter the scene can be ignored for abandonment determination purposes so as to allow the system to correctly identify the object as abandoned even after new people enter the FoV.

Another alternative implementation includes determining whether an object has been dropped versus placed down, as being placed is an indicator of a left behind event, while being dropped is not, or is less of an indicator.

Another alternative implementation includes detecting a non-background object, and then identifying or classifying the object as abandoned when a predetermined radius around the object is clear of all people. According to some such implementations, a simple metric for classifying the object as abandoned could be if all people have left the FoV of the 3D camera. While implementations using this simple metric may not be suited for some very busy environments, such implementations can be suitable for scenarios with light or no expected people traffic (for example, sites with few people entering and exiting the scene). Another metric could be a measured distance between person and the object and setting a threshold distance.

In various embodiments, a timer (such as, for example, 3-15 seconds or other suitable duration) can be triggered or started once an object is initially classified as abandoned or left behind based on distance, (for example, an exclusion zone), to reduce false positives, for example, to ensure that the owner really has indeed left it behind. The timer can be reset or paused if the person gets near the object again. For example, consider if the timer value is 10 seconds, and if the person exits the exclusion zone around the object at time zero, and then re-enters the exclusion zone four seconds later, (which is before a threshold amount of time has elapsed such as, for example, 10 seconds), then the timer can be paused at four seconds. If the person subsequently exits the exclusion zone and remains outside the exclusion zone for another six seconds or more, the system may determine that the that the object has been left behind.

Using the distance data from a 3D camera (for example, 3D depth data) improves over traditional 2D surveillance data because it can result in less false positives and a higher detection rate for objects left behind. Because of the additional depth data in the images, the disclosed systems and method using 3D cameras may perform object left behind analysis better in challenging, busy environments with many people and objects, such as, for example, crowded airports, schools, transit stations, concert venues, sports arenas and stadiums, and crowded public spaces.

Various implementations enable automation of detecting objects left behind, such as, for example, objects left behind by people at a security checkpoint of an airport, train station, school, casino, prison, government facility, stadium, arena, or financial institution. In some implementations, the implementations can include, for example, using 3D cameras and person tracking algorithms. Certain implementations enable efficient detection of objects left behind (for example, abandoned objects), even in cases where the objects are left behind in busy, crowded environments.

FIG. 1 is a block diagram illustrating an example of an operating environment 100 for detecting objects left behind, according to one or more implementations of the disclosure. As shown, the operating environment 100 may include one or more systems including an object identification server 102, a client device 118 with a 3D camera 120 (for example, a 3D video camera), a data store or system storing previously collected video data and video primitives (not shown, but see video storage 227 and 804 and primitive storage 225 and 805 of FIGS. 2 and 8), and various other systems (not shown) such video surveillance systems, which may interact via one or more networks 115. The one or more networks 115 may be or include any type of wired or wireless network including a local area network (LAN), a wide area network (WAN), a mobile communications network, and the Internet.

The client device 118 may include the 3D camera 120 and a surveillance application 122 (or application software) which may include program code (or a set of instructions) that performs various operations (or methods, functions, processes, etc.) as further described herein.

In the operating environment 100 the 3D camera 120 may be mounted top down to accurately segment new objects 124 from a background of an area being monitored (for example, a room at an airport, school, or concert venue in the non-limiting example of FIG. 1). The operating environment 100 performs person tracking to determine if an owner (for example, a person 116) of an object 124 has met the criteria (for example, moved sufficiently away from the object 124) needed to classify the object as being "left behind" (i.e., abandoned) in an automated fashion.

The surveillance application 122 may include any type of surveillance application or "app" such as a 3D video surveillance application, a 3D video security monitoring application, or a 3D video capture app. As shown in FIG. 1, the client device 118 may be installed at busy, densely populated locations such as, but not limited to, airports, schools (e.g., school campuses, classrooms, school hallways), prisons, casinos, factories, government buildings, critical infrastructure locations, loading docks, retailers (e.g., retail stores), or concert venues. It is to be understood that the client device 118 may be remote from or local to the object identification server 102, and that the client device 118 can be installed at other environments such as, for example, a bank lobby, a hotel lobby, a transit station, a stadium, a library, a bus, an aircraft, or other environments where a person 116 may leave an object 124 behind.

Additionally, the operating environment 100 can include one or more communications channels 117 (such as, for example, wired and/or wireless communication links) used to transmit a video stream, images, and other data via the network 115 communicatively and operatively linking the object identification server 102 with the client device 118. In some implementations, the client device 118 and the object identification server 102 may be collocated or hosted on the same platform (for example, a server or server farm) and communicate with each other without the network 115 via a direct communication link, or other suitable connection.

In some implementations, sets of training data of previously detected object left behind events from previously collected video data (see, for example, the video storage 227 and video frames 237 of FIG. 2, described below) may be used to train a machine learning model to determine criteria such as what size an exclusion zone should be and how long the person 116 should be outside of an exclusion zone before the object 124 should be determined to be abandoned or left behind. For example a machine learning model may be trained to suggest that a distance or time threshold for identifying objects as abandoned be dynamically altered (for example, lowered or increased) based on historical patterns in past actions by the person 116 within the operating environment 100. In this way, the model may be trained to output threshold distances, timers, and/or durations deemed to be appropriate for a given site. For example, the model may be trained to recognize scenarios falling within normal usage patterns for the person 116 and the object 124 based on previously collected video data of people and objects (see, for example, video frames 237 of FIG. 2, described below) indicating that a person 116 typically leaves behind or abandons an object 124 when the person 116 exits a radius or exclusion zone around the object 124 for a certain duration such as, for example, 8 seconds or other suitable duration. In this example, if the person 116 places the object 124 down at LOAM near an airport security checkpoint, the trained machine learning model may suggest that the object 124 exceeds an object left behind timing threshold if the person 116 leaves an exclusion zone around the object 124 for more than 10 seconds. Also, for example, the surveillance application 122 may also interact with or access a GPS component of the client device 118 to obtain location information provided by the client device 118 to assist in confirming the location of the person 116 relative to the object 124. According to some examples, previously collected video data, which includes video data for a specific location where the person 116 and the object 124 are currently located, is used to train the machine learning model to flag the object 124 as left behind by the person 116 when an amount of time that the person is outside of an exclusion zone that includes the object 124 exceeds a dynamic threshold. For instance, the surveillance application 122, which has been informed by the machine learning model, may classify, identify, or flag the object 124 as being left behind based on video of the person 116 received from the 3D camera 120 when the surveillance application 122 determines that the person 116 has placed the object 124 on a surface and moved more than 5 feet away for longer than a person at that location typically does when they do not leave objects behind.

In one implementation, the surveillance application 122 may be provided to the client device 118 and developed by a third-party. For example, a third-party may include an entity (such as, for example, a security company, a government agency, etc.) that is different from the entity that may manage the object identification server 102. As shown in FIG. 1, the client device 118 may be ceiling-mounted device, a wall-mounted device, or a kiosk that includes the 3D camera 120 and is suitable to be installed at busy locations such as, for example, airports, schools, and concert venues. However, in one implementation, the surveillance application 122 may be a video surveillance application provided by the private entity or government entity that manages the object identification server 102 and may interact with a third-party service or system to detect an object 124 left behind by a person 116. In one implementation, the surveillance application 122 may be installed onto the operating system of the client device 118. In addition, in one implementation, a person tracking application or module (for example, person tracking module 108) may reside (at least partially) on a backend or remote system (for example, object identification server 102) with the various components (for example, front-end components of the surveillance application 122) residing on the client device 118. As further described herein, the surveillance application 122 and the object identification server 102 may perform operations (or methods, functions, processes, etc.) that may require access to one or more peripherals and modules. In the example of FIG. 1, the object identification server 102 includes a video analysis subsystem 104, a background segmentation module 106, an object detection module 107, and a person tracking module 108.

The data produced by the 3D camera 120 includes information indicating the distance from the camera 120 of each pixel that make up the items (for example, object 124, person 116, background surface, etc. over time) in each image or frame, and the object identification server 102 uses this distance information to perform various operations and functions described herein. The operations and functions use distance information to perform people tracking to increase the accuracy of detecting an object left behind. Doing such people tracking incorporates many video frames over time. Example functions include a background creation function that can take either a one frame snapshot or many frames to create a composite background model. Averaging each pixel in the frame is one way of doing this. Some implementations use the first frame as a starting point and save this as a background model. In one such implementation, the second frame is used to compare on a pixel by pixel basis, and the smaller value of the two is stored into the background model. Based on how noisy the depth data is, an implementation can do this over many frames (for example, 100 frames) in order to get a stable background model. For a stereoscopic type depth image from a stereoscopic camera, there may be zero confidence value pixels (typically represented by zero depth value). Whenever an actual valued pixel exists compared against a zero confidence pixel, the actual value pixel can be used in the background. An implementation can also constantly update the background (for example, using a Gaussian model for each pixel). This implementation can store the stable state and ignore motion, which can be helpful when a person or another moving object (for example, a vehicle) is initially in the FoV occluding part of the background and later moves away. Updating the background allows the background model to be filled in for the occluded area with the correct background.

The example functions can also include a foreground function that takes the current depth frame (which may be an average of 1 or more actual frames) and compares it to the background image. Whenever the value for a pixel is less than the background, that value is stored as a foreground pixel. If it is the same as or greater than the background, then a value of zero is stored. This creates a foreground image where all non-zero value pixels are of interest. The example functions can also include a classification function that determines whether a blob in the foreground is a person or not, and a person tracking function that tracks each individual person in the FoV over multiple frames while they remain in the FoV of the camera. The functions can further include an object tracking function that tracks objects in the scene that are not people. Additionally, an Object Left Behind function can associate an object that has been tracked with a person, and when the person has moved sufficiently away, the Object Left Behind function can start a counter. If the same person moves back into the scene (or the counter can be stopped or restarted. If the counter reaches a certain threshold then an alert occurs.

In certain implementations, a technique for automated object left behind detection performed in the environment 100 includes using the 3D camera 120 mounted top down, and scanning, by the background segmentation module 106, a 3D background captured by the 3D camera 120, which background may be composed primarily of stationary objects at the location, such as floors, counters, chairs, tables, and the like. According to such implementations, the background segmentation module 106 then calculates a difference between object 124 and person 116, and the background. The difference may be calculated based at least in part on baseline camera footage at a site captured before a detected object 124 and person 116 entered the site. The difference between the object 124 and the background can also be calculated based at least in part on comparing the distance of the object from the 3D camera 120 (for example, a 3D depth) to distances (for example, depths) of known background objects (such as, for example, floor(s), countertops, desktops, shelves, and other surfaces).

The video analysis subsystem 104 may be implemented as an application (or set of instructions) or module configured to perform operations (or methods, functions, processes, etc.) for receiving, processing, and analyzing 3D camera data, for example, 3D camera images and/or a 3D video stream, via the network 115, from the 3D camera 120 of the client device 118. In some implementations, the 3D video stream includes live video frames or images of a person 116 and an associated object 124 (such as, for example, the person's bag, briefcase, suitcase, backpack, mobile phone, etc.) within a FoV of the 3D camera 120 of the client device 118. The 3D video stream can comprise frames where each frame includes or is accompanied by information (such as, for example, meta data, video primitives, depth-representative colors in the frame, or the like) that indicate the distance of each portion (such as, for example, each pixel, group of pixels, area, or the like) of the frame from the 3D camera 120. In some implementations, this distance information may be encoded or represented by the color of each portion of the frame. The video analysis subsystem 104 may analyze a video stream received from the 3D camera of the client device 118 via the network 115 to derive video primitives, which may be stored (see, for example, primitive storage 225 and 805 of FIGS. 2 and 8, described below). The video analysis subsystem 104 may further control storage of all or portions of the video stream in a video storage (see, for example, video storage 227 and 804 of FIGS. 2 and 8), for example, controlling the quality and/or quantity of 3D video, as discussed below with reference to FIGS. 2 and 8. The video analysis subsystem 104 may analyze frames of 3D video using existing video and image processing techniques. The video analysis subsystem 104 may perform digital image processing operations or tasks on frames of the 3D video, such as feature extraction, classification, and pattern recognition, the details of which will be understood by those skilled in the art. Such digital image processing operations may be performed by the video analysis subsystem 104 in order to detect or identify the specific video frames captured by the 3D camera 120 that include the person 116 and the object 124.

The background segmentation module 106 may be implemented as an application (or set of instructions) or module configured to perform operations (or methods, functions, processes, etc.) for accurately segmenting certain objects (for example, transitory objects such as the object 124 and the person 116 associated with the object 124) from the background of the video frames captured by the 3D camera 120. The background segmentation module 106 may use computer vision techniques that include performing computer vision tasks such as image segmentation (for example, segmenting the video frames into portions containing the background of a scene and portions that contain foreground blobs such as a 'person plus object' blob including the object 124 and the person 116).

The object detection module 107 may be implemented as an application (or set of instructions) or module configured to perform operations (or methods, functions, processes, etc.) for scanning and recognizing data objects present in video frames received from the 3D camera 120. The object detection module 107 may use current computer vision techniques and algorithms to recognize blobs that are or include stationary and moving objects present in the video frames, which techniques and algorithms will be understood by those skilled in the art. Such computer vision techniques used by the object detection module 107 may use the results or output of digital image processing operations performed by the video analysis subsystem 104. The computer vision techniques may include performing computer vision tasks such as, for example, object recognition (for example, object classification to classify objects found within the video frames as being a specific type of thing, such as a person or a chair), object identification to identify individual instances of objects (for example, identifying the object 124 and the person 116 present in the video frames), analyzing image data to detect specific conditions (for example, scanning the video frames to detect the introduction of the object 124 and an exit of the person 116 from a scene), and image segmentation (for example, segmenting the video frames into portions containing the background determined by the background segmentation module 106, and portions containing other items, such as the object 124 and the person 116). In some implementations, the object detection module 107 may perform computer vision tasks such as object recognition, classification, and identification to disambiguate multiple objects (for example, stationary and non-stationary objects) in video frames from the 3D camera 120. For example, the object detection module 107 may be configured to work in conjunction with the person tracking module 108 to be able to determine that a detected object has been left behind by a tracked person (for example, the person 116).

The person tracking module 108 may be implemented as an application (or set of instructions) or module configured to perform operations (or methods, functions, processes, etc.) for tracking a person 116 in video frames received from the 3D camera 120. In some implementations, various techniques for tracking the person 116 can be used by the person tracking module 108, which techniques will be understood by those skilled in the art. For example, Kalman filtering or a Condensation computer vision algorithm can be used to track the detected object 124 and the person 116 in video frames. Also, for example, a template matching technique can be used to track moving objects (for example, the person 116) and stationary objects (for example, the object 124 after it is set down). As a further example, a multi-hypothesis Kalman tracker can be used to track the object 124 and the person 116.

Also, for example, the person tracking module 108 may compare the location of the person 116 in a video frame as detected by the object detection module 107 to a predetermined, optionally tunable exclusion zone to calculate or otherwise determine a confidence level representing whether the person has left an object behind. In some implementations, the size of the exclusion zone may be learned. The learning may be based at least in part on supervised or unsupervised machine learning using training data sets. In certain implementations, the object identification server 102 may observe and analyze a given video scene for an extended period of time, and may detect all stationary objects, such as the object 124 and the distances from other objects to the stationary objects to learn the typical normal distance between the stationary object 124 and the person 116 that put the object down. Similarly, the typical normal duration of time that a person may spend outside of the exclusion zone before retrieving the object may also be learned. By using sets of training data of previously captured video frames to train a machine learning model, the person tracking module 108 may improve object left behind detection results over time (for example, trigger fewer false positives misidentifying objects as being abandoned).

In certain implementations, the 3D camera 120 is not mounted top down. For example, such implementations may use a 3D camera 120 that is mounted in a peripheral area of a room (for example, a corner) with a somewhat horizontal sight line (for example with a sight line that is from about 5 degrees to about 55 degrees below horizontal), as this type of mounting increases the FoV of the 3D camera 120 compared to top down ceiling mounting. These implementations can use modified algorithms for the object detection module 107 and the person tracking module 108 to accommodate the greater chance of occlusion and the angled views that occur with the use of a peripheral-mounted 3D camera 120.

Figure 6:
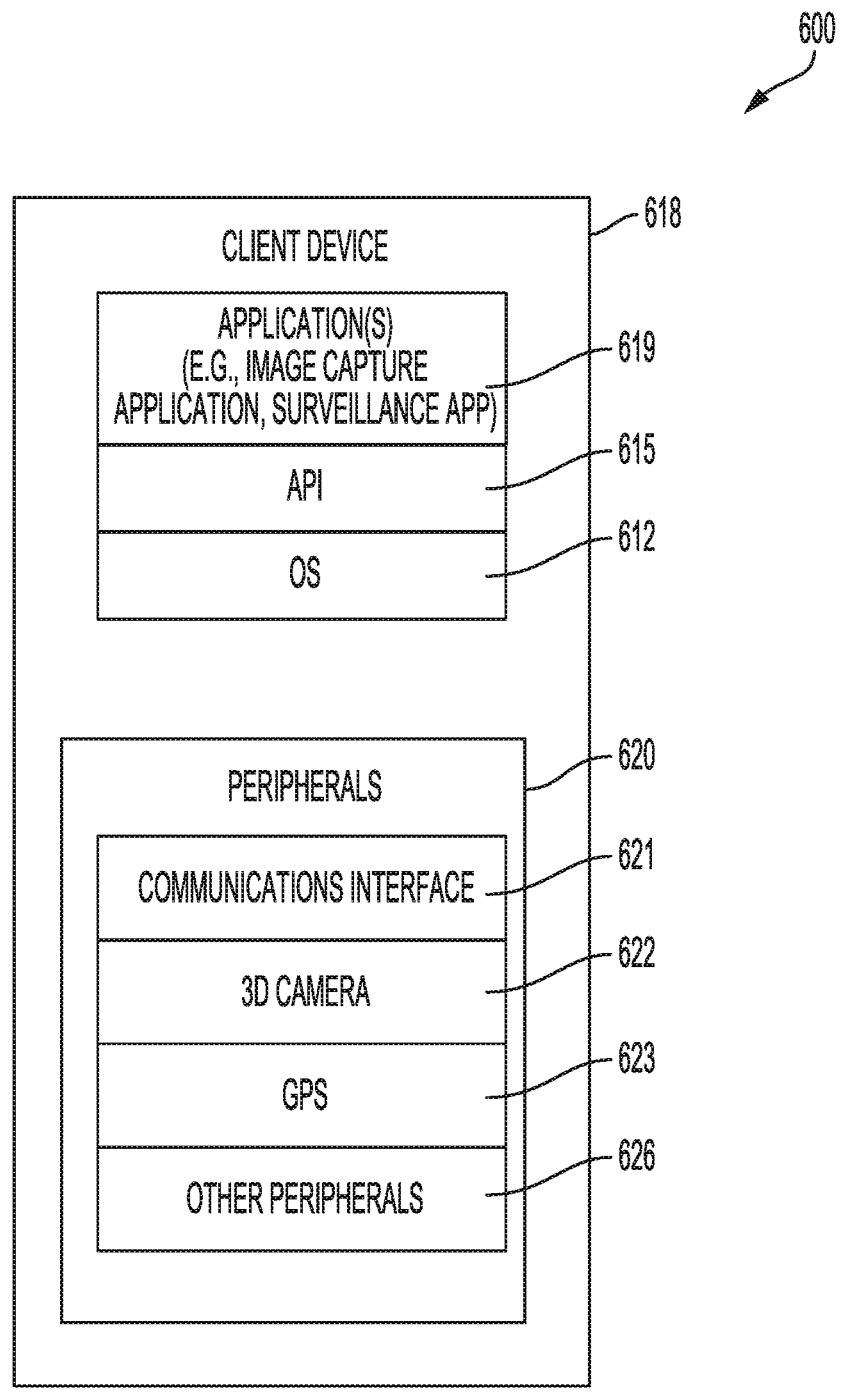
FIG. 6 is a block diagram illustrating an example of a client device according to one or more implementations.

Peripheral(s) of the client device 118 may include components (for example, I/O components) of the client device 118, some or all of which provide a user interface to the client device 118. In one example where the client device 118 is implemented as a mobile surveillance device (for example, a wireless 3D camera that can be moved to multiple locations at a site), peripherals may include surveillance specific peripherals, which are components that are typically not found on other types of fixed surveillance devices (such as, for example, a 3D camera, GPS and communications interface, etc. as shown in FIG. 6).

When performing operations, the client device 118 may interact with the object identification server 102. The object identification server 102 may be any type of online system, service or application such as a server, website, network-accessible API, etc. that is associated with the person tracking module 108 and the surveillance application 122 (for example, a video surveillance app in the example of FIG. 1) on the client device 118. For example, the object identification server 102 may be an online service that interacts with the surveillance application 122, which is remotely accessed by the client device 118. For example, the online service may include private security service, a government service, a school service, etc. In one implementation, the object identification server 102 may be remote from the client device 118 (for example, a separate system accessed via the network 115) and associated with a third-party providing the surveillance application 122.

In some implementations, the client device 118 may be a ceiling-mounted device (for example, with an integrated, ceiling-mounted 3D camera), a wall-mounted device, or table-mounted device. As described, the object left behind detection provided by the object identification server 102 may have a corresponding surveillance application 122 (for example, corresponding surveillance application available on an application store for various platforms) that is installed on the client device 118.

It should be noted that each of the systems described in environment 100 may include one or more systems (such as, for example, servers or computers). For example, a database server(s) and a cloud-based storage system may form the object identification server 102.

Figure 2:
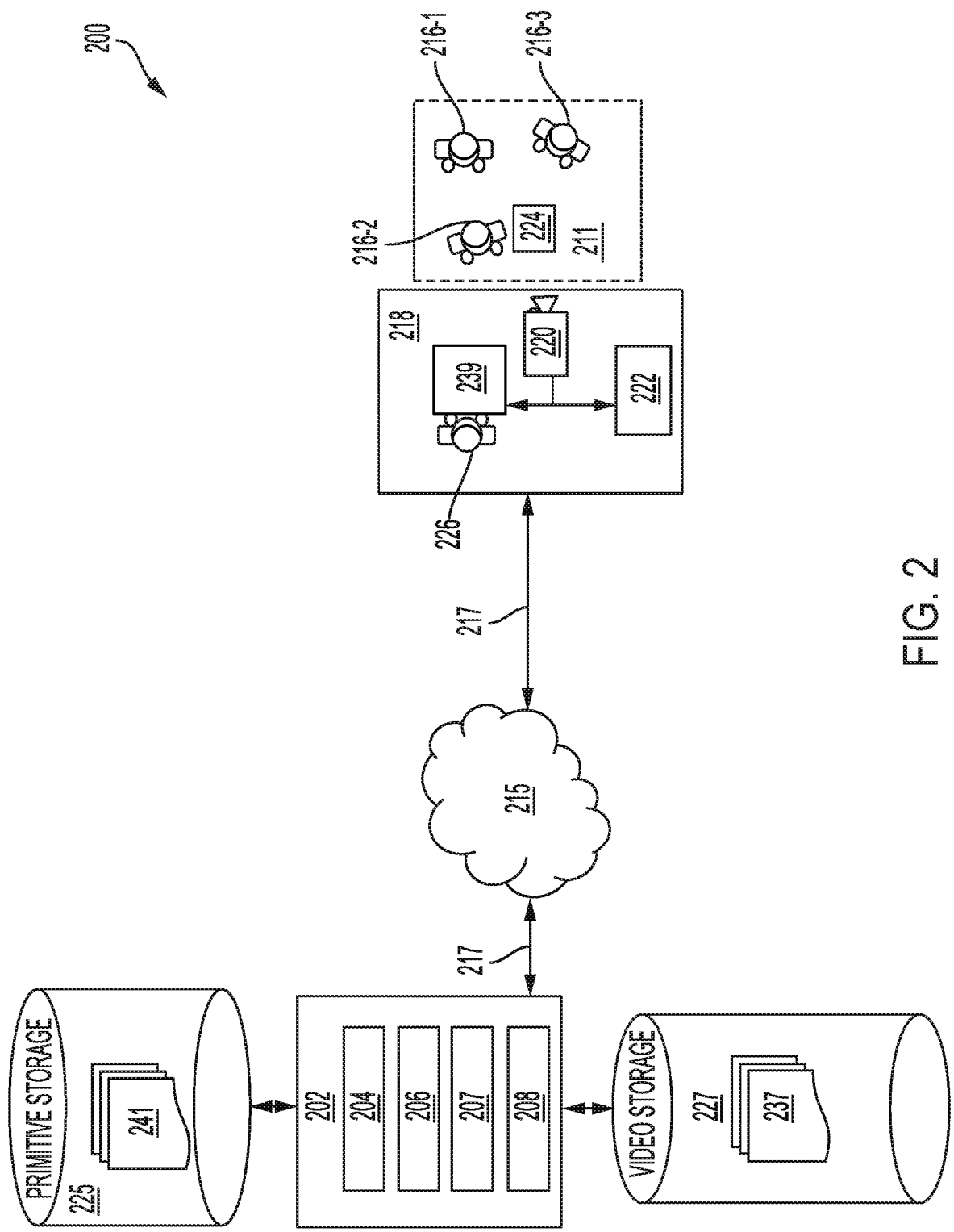
FIG. 2 is a block diagram illustrating an example of an environment for implementing systems and processes for object left behind detection, according to examples of the present disclosure.

FIG. 2 shows a block diagram illustrating an example of an environment 200 for implementing systems and processes for object left behind detection in accordance with aspects of the present disclosure. The environment 200 can include an object identification server 202 and a client computing system 218 and a location 211 (such as, for example, an airport, bank, transit station, concert venue, stadium or other location where abandoned object detection is desired). Additionally, the environment 200 can include one or more communications channels 217 (such as, for example, wired or wireless communication links) and one or more networks 215 (such as, for example, local area networks, wide area networks, mobile communications networks, and the Internet) communicatively and operatively linking the object identification server 202 with client computing system 218.

The monitored location 211 can be an area occupied or visited by persons 216 (for example, persons 216-1, 216-2, 216-3). In some implementations, the monitored location 211 can be public or commercial spaces, such as an airport, a retail store, a financial institution (for example, a bank lobby), a school, a transit station, a concert arena, a theater lobby, an area of a stadium (such as, for example, a security checkpoint, bag check, etc.), or the like. Additionally, the monitored location 211 can be staffed by one or more personnel 226 such as, for example, security personnel, airport personnel, airline personnel, receptionists, bank tellers, or other such personnel carrying out his or her job functions within the location 211.

In implementations, the client computing system 218 can include the surveillance application 222 and the one or more 3D video cameras 220. The client computing system 218 can be one or more general-purpose or application-specific computer systems configured to capture a video stream of the persons 216 and the object 224 in the location 211 using one or more 3D video cameras 220 and a surveillance application 222 and transmit the video stream to the object identification server 202. The surveillance application 222 can be operatively and communicatively connected to the 3D camera 220 and an I/O device 239. According to certain implementations, the I/O device 239 can be an airline check-in kiosk, a ticket terminal, a passport control terminal, a customs terminal, an automated teller machine, a retail-checkout system, an information kiosk, a desktop computer, or the like.

In implementations, the client computing system 218 is or includes a special-purpose system incorporating the 3D video camera 220 and is configured to perform surveillance of persons 216-1, 216-2, 216-3 and the object 224 using distance (depth) information from the images or frames generated by the 3D video camera 220. For example, image processing of video frames captured by the 3D camera 220, object recognition of the object 224 appearing in the video frames, and people tracking of persons 216-1, 216-2, 216-3 appearing in the video frames can be performed by an object identification server 202 using the distance information. The object identification server 202 can perform various functions for detecting when the object 224 has been left behind by the person 216-2 by using a video analysis subsystem 204, a background segmentation module 206, an object detection module 207, and a person tracking module 208.

The I/O device 239 can be or include any device that enables the persons 216 or the personnel 226 (for example, a customer service representative) to interact with the client computing system 218. The I/O device 239 may comprise, for example, a scanner (such as, for example, an identity card scanner, a passport scanner, a ticket scanner and the like), a touchscreen display, pointer device, keyboard, speech recognition hardware and capabilities, etc. The one or more 3D cameras 220 can include cameras (still or video) that capture 3D images of or otherwise record the monitored location 211, including the persons 216-1, 216-2, 216-3 therein (for example, the persons in the areas used by the public, customers, or passengers). As noted above, 3D images, or the data accompanying the 3D images, include information regarding the distance from the camera 220 of each pixel in an image.

The object identification server 202 can be one or more general-purpose or application-specific computer systems configured to function as an information hub between video storage 227, primitive storage 225, and the client computing system 218. In particular, the object identification server 202 can use the video analysis subsystem 204 to analyze the video stream from the 3D camera 220. The video analysis subsystem 204 can perform analysis of the video stream to derive video primitives 241, which may be stored in the primitive storage 225. Although the primitive storage 225 and the video storage 227 are depicted as being separate computer readable media in the non-limiting example of FIG. 2, it is to be understood that the primitive storage 225 and the video storage 227 need not be each on separate media but may instead be on a single computer readable medium. The video analysis subsystem 204 may further control storage of all or portions of the video stream as video frames 237 in video storage 227. The object identification server 202 can perform various functions for receiving a video stream from the client computing system 218, storing the video primitives 241 in the primitive storage 225, storing the video frames 237 in the video storage 227, and analyzing the stored video frames 237 and/or stored video primitives 241 to detect when the object 224 has been left behind by the person 216-2 by using the video analysis subsystem 204, the background segmentation module 206, the object detection module 207, and the person tracking module 208.

Additionally, the object identification server 202 can provide various functions and services to the client computing system 218. For example, in response to, as part of, or in association with detecting that person 216-2 at the location 211 has left behind the object 224, the object identification server 202 can provide a graphical, textual, or audio alert to be displayed or presented by the client computing system 218.

In a non-limiting example consistent with some implementations consistent with the present disclosure, the monitored location 211 is a busy environment with multiple persons 216-1, 216-2, 216-3 such as airports, banks, schools, and concert venues that are monitored by the client computing system 218. Using the 3D camera 220, the client computing system 218 can record images of and/or detect the persons 216-1, 216-2, 216-3 in the location 211. Some of the persons 216, such as 216-1 and 216-3, may not be carrying objects, and some of the persons 216, such as person 216-2 may be carrying or otherwise introduce an object 224 into the location 211.

Additionally, using the one or more 3D cameras 220 (for example, 3D video cameras), the surveillance application 222, and the object identification server 202, the client computing system 218 can track, determine, and record information representing the person 216-2 leaving the object 224 behind at the location 211. Actions can be or include, for example, foot traffic patterns, which may be represented by information such as a time of the person 216-2 entering the location 211, an amount of time in the location 211, a time of departing the location 211 (or a defined exclusion zone within the location) and the like. The actions can also include person 216-2 interacting with the object 224 and/or other persons 216-1, 216-3 at the location 211, which may be represented by information describing whether or not the person 216-2 physically put down the object 224 item and a timestamp indicating when the person 216-2 put the object 224 down.

Additionally, the actions can include transactions with the personnel 226 (such as, for example, a person at a security checkpoint, a customer service representative, a teller, or a cashier), the I/O device 239, where the I/O device 239 may be an airline check-in kiosk, a ticket terminal, a passport control terminal, a customs terminal, an automated teller machine, a retail-checkout system, an information kiosk, or the like. Further, the actions can include security events, such as detecting shoplifting or leaving unattended packages.

The client computing system 218 can update the video primitives 241 stored in the primitive storage 225 and the video frames 237 stored in the video storage 227, with information obtained from the 3D camera 220 that records the actions and interactions of the persons 216-1, 216-2, 216-3 in the monitored location 211 with respect to the object 224. Continuously (for example, in real-time or near real-time), or periodically (such as, for example, each second, fractions of a minute, fractions of an hour, or hourly), the client computing system 218 can send a video stream to the object identification server 202, which can use the video stream to update the video primitives 241 and the video frames 237. Additionally, in accordance with aspects of the present disclosure, the object identification server 202 can be selectively triggered to update the video primitives 241 and the video frames 237. For example, when the client computing system 218 provides (for example, uploads) a new video stream to the object identification server 202, the client computing system 218 can trigger an action, for example, by sending a notification message to the object identification server 202 that informs it that there is new footage captured by the 3D camera 220. The object identification server 202, in response to the trigger, may synchronize or update the video primitives 241 and the video frames 237 by obtaining (for example, downloading) the new video footage from the client computing system 218.

Figure 3:
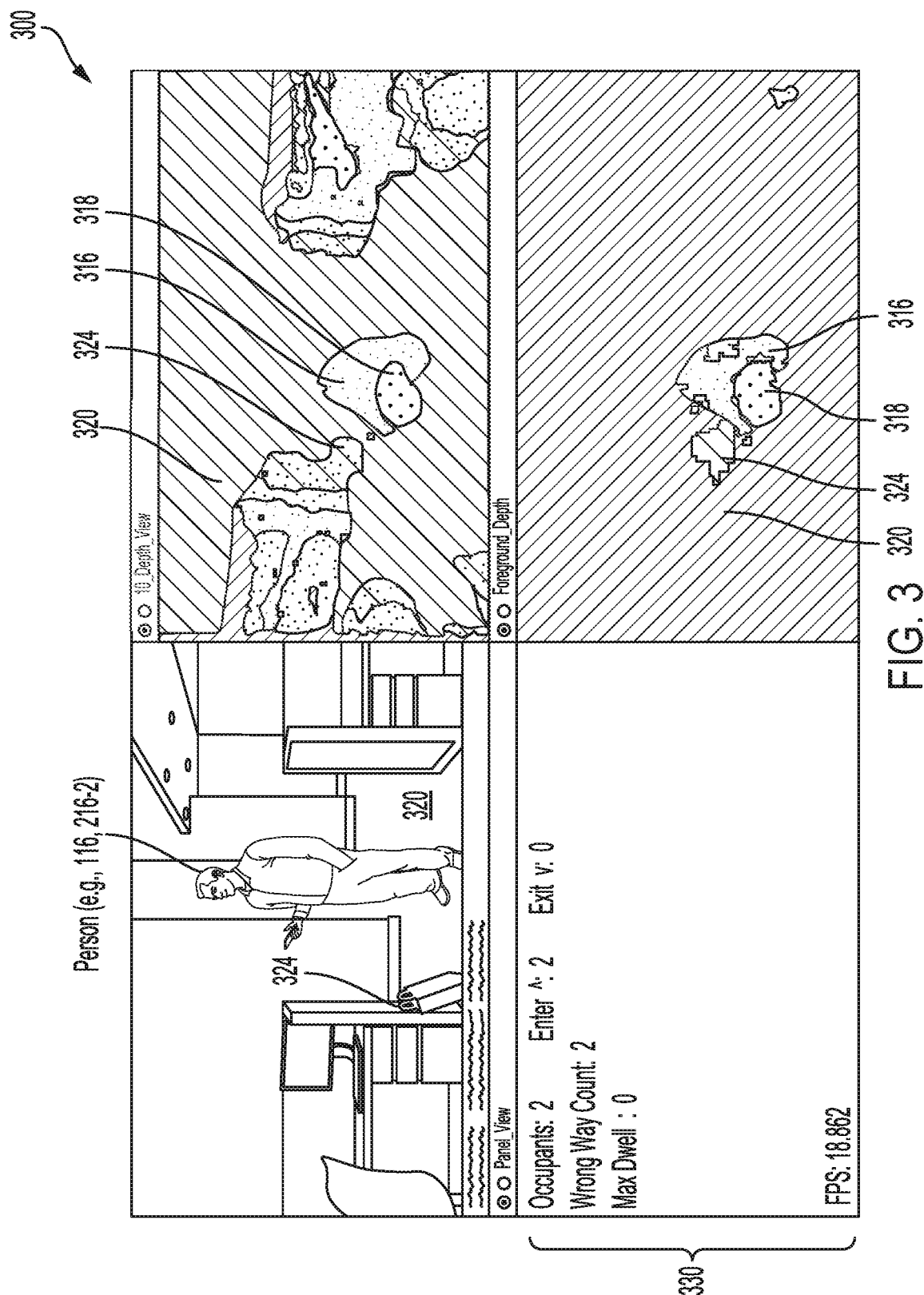
FIG. 3 depicts an example of a user interface of a system for object left behind detection, according to examples of the present disclosure.
Figure 4:
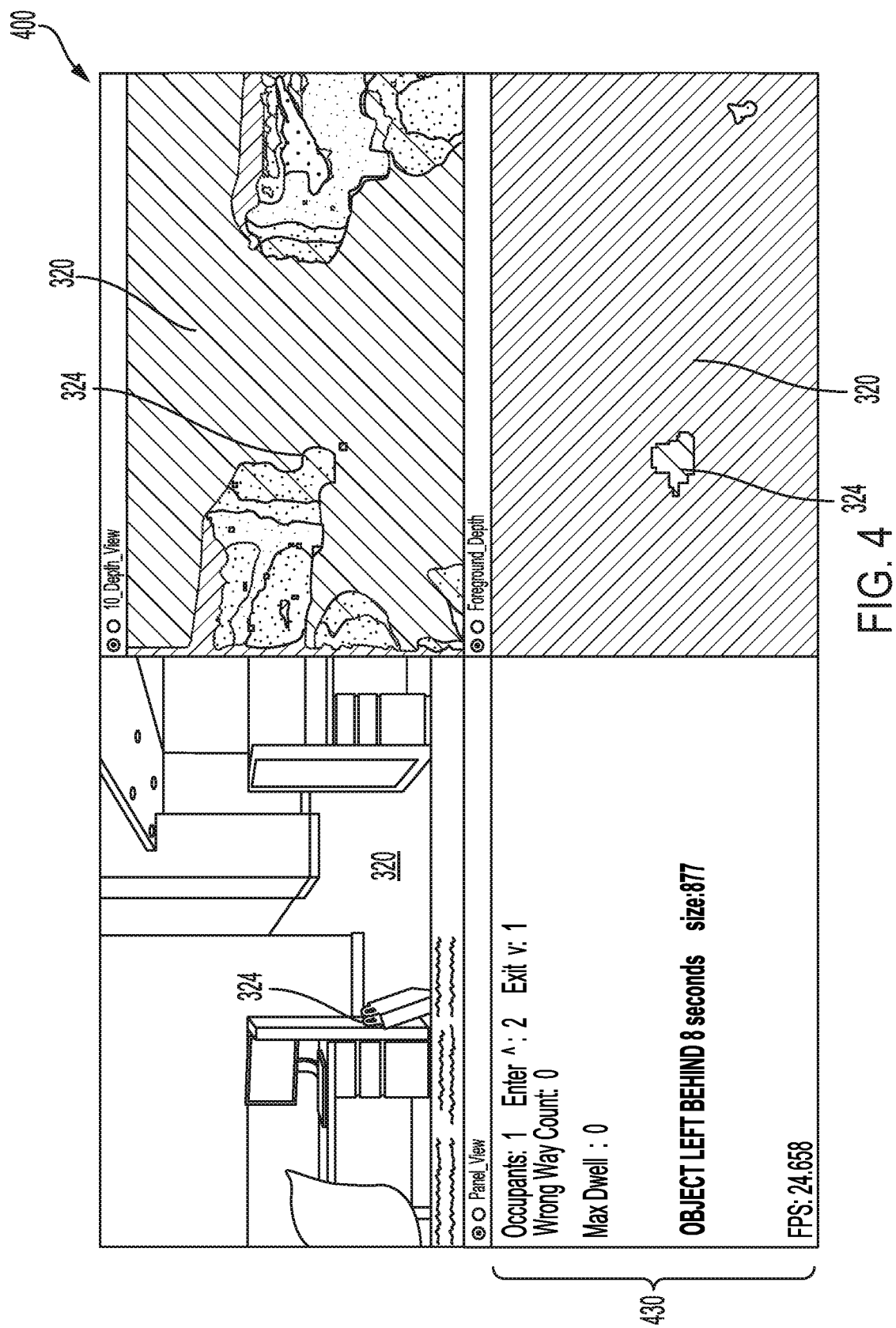
FIG. 4 depicts an example of a user interface of a system for object left behind detection, according to examples of the present disclosure.

Examples of user interfaces for an object left behind detection system are depicted in FIGS. 3 and 4. The user interfaces 300 and 400 depicted in FIGS. 3 and 4 are described with reference to the implementations of FIGS. 1 and 2. However, the user interfaces are not limited to those example implementations. In some implementations, the user interfaces 300 and 400 are displayed on a display associated with the object identification servers 102 and 202 of FIGS. 1 and 2. For ease of explanation, the object left behind detection operations discussed in FIGS. 3 and 4 are in the context of modules and applications executing on a computing device with a display device. It is to be understood that the user interfaces illustrated in the example implementations of FIGS. 3 and 4 can be readily adapted to execute on displays of a variety of computing device platforms running a variety of operating systems that support an interactive user interface.

Throughout FIGS. 3 and 4, displays are shown with various panes, screen shots, views, buttons, links, command regions, panels, and windows that are used to display recognized objects, display a tracked person, initiate action, invoke routines, select view types, display analysis results such as an object left behind alert, or invoke other functionality. The initiated actions include, but are not limited to, selecting views to be displayed, selecting object left behind criteria, generating an object left behind alert, and other object left behind system actions. For brevity, only the differences occurring within FIGS. 3 and 4, as compared to previous or subsequent ones of the figures, are described below.

FIG. 3 depicts an example user interface 300 of a system for object left behind detection, according to examples of the present disclosure. In the example implementation of FIG. 3, the object identification server 102 may display multiple panes or windows within the user interface 300 corresponding to shoulders/torso 316 of a person, a head 318 of the person, and an object 324 within a monitored location. As shown, in a first, upper-left pane, the user interface 300 displays a perspective view with a 2D image (for example, a video frame of a person (for example, a person 116, 216-2) who has placed an object 324 (for example, a shopping bag) on the floor 320).

Using a top-down image or frame from a 3D camera (for example, a ceiling-mounted 3D camera 220), a depth view pane (upper right within the user interface 300) displays the items in the FoV with information indicating their distance (depth) from the 3D camera. In the example shown in the depth view pane of FIG. 3, the distance from the 3D camera of each area, portion, or surface of the 3D image is indicated by the different types of cross-hatching and speckling information shown. For example, the floor 320, which is the portion of the 3D image that is furthest away from the 3D camera, is represented by the wide left-to-right-upward crosshatching information; the head 318 of the person, which is the portion of the 3D image that is nearest to the 3D camera, is represented by the large uniform speckling information; the shoulder and arms 316 of the person, which is a portion of the 3D image that is a little farther than the head 318 from the 3D camera, is represented by the small random speckling information; and the object 324, which is the portion of the 3D image that is a little closer than the floor from the 3D camera, is represented by the small random speckling combined with left-to-right-upward crosshatching information. In the 3D image shown in FIG. 3, the object 324 is near the shoulders/torso 316 and the head 318 of the person who is in the room.

In a typical image produced by a 3D camera, the depth information is often color-coded, where different depths are displayed in different colors or hues to indicate the distance of each pixel, area, or portion of the image from the 3D camera. Referring again to the example of FIG. 3, because we cannot easily use colors in patent drawings, different fill patterns of cross hatching, speckling, etc. are used instead of, or to represent, different colors and to illustrate that the head 318 of the person is displayed differently than the shoulders and torso 316 of the person and differently than the object 324, and differently than the floor 320, based on the distance of each of these items from the 3D camera. However, in various implementations of the depth view pane, different colors, hues, or shading can more typically be used to indicate the respective, measured 3D depths for the shoulders/torso 316 and the head 318 of the person, the object 324, and the floor 320, etc.

For example, items (for example the upper surfaces of objects and people) that are nine feet from the 3D camera (for example, the floor 320) may be colored red, items that are eight feet from the 3D camera (for example, a top of the object 324) may be colored orange, items that are seven feet from the 3D camera (for example, a chair seat) may be colored yellow, items that are six feet from the 3D camera (such as, for example, desktops, counter tops, and shelf tops) may be colored green, items that are five feet from the 3D camera (for example, the top edges of cubicle walls/dividers of FIG. 3) may be colored cyan, items that are four feet from the 3D camera (for example, the shoulders/torso 316 of the person) may be colored blue, items that are three feet from the 3D camera (for example, the top of the head 318 of the person) may be colored violet, etc. Similarly, items that are in between these distances may be color-shaded appropriately; for example, a surface such as the floor 320 that is nine feet from the 3D camera may be colored red-orange in the image produced by the camera. That is, different shadings, colors, or hues may be used in video frames from a 3D camera to indicate different 3D depths of the floor 320 (for example, nine feet), the head 318 (for example, three feet—indicating a 6 foot tall person standing 6 feet from the floor 320), the shoulders/torso 316 of the person (for example, four feet), and the object 324 (for example, 1 foot).

The depth view pane of FIG. 3 shows how 3D depths or distances from a 3D camera can be used to establish a background with the floor 320 and to detect a significant difference in the form of a foreground object that includes the shoulders/torso 316 and head 318 of the person and the object 324 associated with the person (for example, a 'person plus object' blob). Based on the distance of the person (for example, the head 318 of the person as viewed from a ceiling-mounted camera) from a 3D camera and the distance of the object 324 from the 3D camera, certain implementations can detect a 'person plus object' foreground blob that includes the person and the object 324. Similarly, 3D depth differences between the shoulders/torso 316 and head 318 of the person and the object 324 can be used to segment or differentiate the object 324 from the person carrying the object. That is, measured distances from a 3D camera can be used to segment the 'person plus object' blob into the person carrying or holding the object 324 and the object 324.

After segmenting the object 324 and person (for example, the person's shoulders/torso 316 and head 318), implementations can perform head tracking of the head 318 of the person (or other person tracking techniques including computer vision tasks) to determine when the person has put or placed the object 324 down on a surface such as, for example the floor 320 of the scene shown in FIG. 3. That is, after distinguishing the person from the object 324 using relative distances from the 3D camera, certain implementations perform person tracking (for example, head tracking of the head 318 of the person) to determine that the person has put down the object 324 based on distance measurements.

With continued reference to FIG. 3, the lower left "panel view" pane displays information 330 determined by the object identification server 102 from the 3D images. In the example of FIG. 3, the information 330 in the panel view includes a count of occupants (for example, detected persons and objects), how many objects have entered the scene, how many objects have exited, a wrong way count, a dwell time, and the frames per second (FPS) frame rate of the 3D camera. The FPS may represent the frequency rate at which consecutive images or video frames appear in the panel view.

In various implementations, in the information 330 shown in the panel view, the wrong way count can represent the number of people entering the scene (i.e., the location being monitored) while traveling/walking in the "wrong" direction as compared to a normal or expected direction for the scene at the given time of day. For example, an event discriminator can be looking for a wrong way' event as defined by a person traveling the 'wrong way' into a security checkpoint or ticketing area of an airport between 9:00 a.m. and 10:00 p.m. The event discriminator checks all video primitives 241 being generated and determines if any video primitives 241 exist which have the following properties: a timestamp between 9:00a.m. and 10:00 p.m., a classification of a 'person' (see, for example, person 116 of FIG. 1) or 'group of people' (see, for example, persons 216-1, 216-2, 216-3 of FIG. 2), a position inside the location being monitored, and a 'wrong' direction of motion. The event discriminators may also use other types of primitives, and/or combine video primitives 241 from multiple video sources to detect event occurrences. Similarly, in the information 330 shown in the panel view, the maximum dwell time can represent the longest duration (for example, in seconds) that a person (for example, the shoulders/torso 316 and head 318 of the person) has remained in the scene.

In FIG. 3, the foreground depth pane at the lower right shows a top-down 3D view of the shoulders/torso 316 and the head 318 of the person, and the object 324 after foreground/background calculations have been performed by the background segmentation module 106 of the object identification server 102 to segment or remove background objects from the image of the scene. As shown, the background objects (see, for example, the floor 320 and the office furniture: desks, filing cabinets, chair and cubicles from the first pane's perspective view) have been segmented and removed in the image shown in the foreground depth pane so that only the head 318 and the shoulders/torso 316 of the person and the object 324 remain displayed. That is, the system has identified the head 318 and the shoulders/torso 316 of the person and the object 324 as being foreground objects that are not part of the non-transitory background of the scene that includes the floor 320 and stationary objects such as the desks and furniture shown in the upper-left pane of FIG. 3.

FIG. 4 shows a user interface 400 with updated views of the panes from FIG. 3 after the person has left the scene. As shown in FIG. 4, in addition to people and object detection, various implementations may also be performing person tracking, which enables the systems and methods described herein to measure the distance between the object's owner (for example, a tracked person) and the object, and compare the measured distance to a threshold (for example, an exclusion zone) in order to distinguish a person who has put an object down but stayed near it from someone who has moved away from an object and perhaps abandoned it. As shown, in the first, upper-left pane, the user interface 400 displays a perspective view with a 2D image (for example, a video frame after the person has placed the object 324 on the floor 320 and left the scene). Using a top-down view from a 3D camera (for example, a ceiling-mounted 3D camera 220), the depth view pane at the upper right within the user interface 400 displays the object 324, which is no longer near the person, who has left the FoV.

With continued reference to FIG. 4, the panel view pane at the lower left displays information 430 calculated, measured, or otherwise determined by the object identification server 102. In the example of FIG. 4, the information 430 in the panel view includes a count of occupants (for example, now zero detected persons and one object, object 324), how many objects have entered the scene (for example, 2—the person and the object 324), how many objects have exited (for example, 1—the person has exited), a wrong way count, a maximum dwell time, an object left behind alert, and the FPS rate of the 3D camera.

The object left behind alert in the example of FIG. 4 indicates that a timer or counter has expired and an approximate size of the object 324 that has been left behind. In FIG. 4, the size value is represented as an approximate number of surface pixels. In certain implementations, a more accurate volume measurement for the object 324 can be obtained and displayed. The size of the object 324 can be determined and a threshold can be set for what is an object of significant size to be considered an object of interest. For instance, an object with the size of a coffee cup may be ignored as insignificant, but some other object either exceeding a certain length in any dimension and/or exceeding a total surface area or volume will be considered an object of interest that may trigger an object left behind alert if abandoned. Some implementations may consider a combination of height and surface area of an object, since the top surface of the object may be small, while the object is relatively tall, or vice versa (for example, the top surface of a relatively short object may be large).

In the example of FIG. 4, the object left behind alert can be displayed as part of the information 430 in the panel view when the person has exited a defined exclusion zone around the object 324 (for example, the FoV) and has not re-entered the exclusion zone for 8 seconds. In various implementations, the counter or timer threshold is a tunable value that can be dynamically adjusted, either manually or automatically, based on the type of scene or location being monitored. For example, the timer can be set higher or lower (5 seconds, 10 seconds, etc.) based on various factors, such as how busy or crowded the environment that is being monitored is. Also, in various implementations, the exclusion zone can be dynamically re-sized (shrunk or expanded) based on various factors, such as how crowded the location is.

In FIG. 4, the foreground depth pane at the lower right shows a top-down 3D view of the object 324 after foreground/background calculations have been performed by the background segmentation module 106 of the object identification server 102 to segment or remove background objects from the 3D image of the scene. As shown, the background objects (see, for example, the floor 320 and the office furniture: desks, filing cabinets, chair and cubicles from the first pane's perspective view) have been segmented and removed from the foreground depth pane so that only the foreground object 324 that has been left behind remains displayed.

Figure 5:
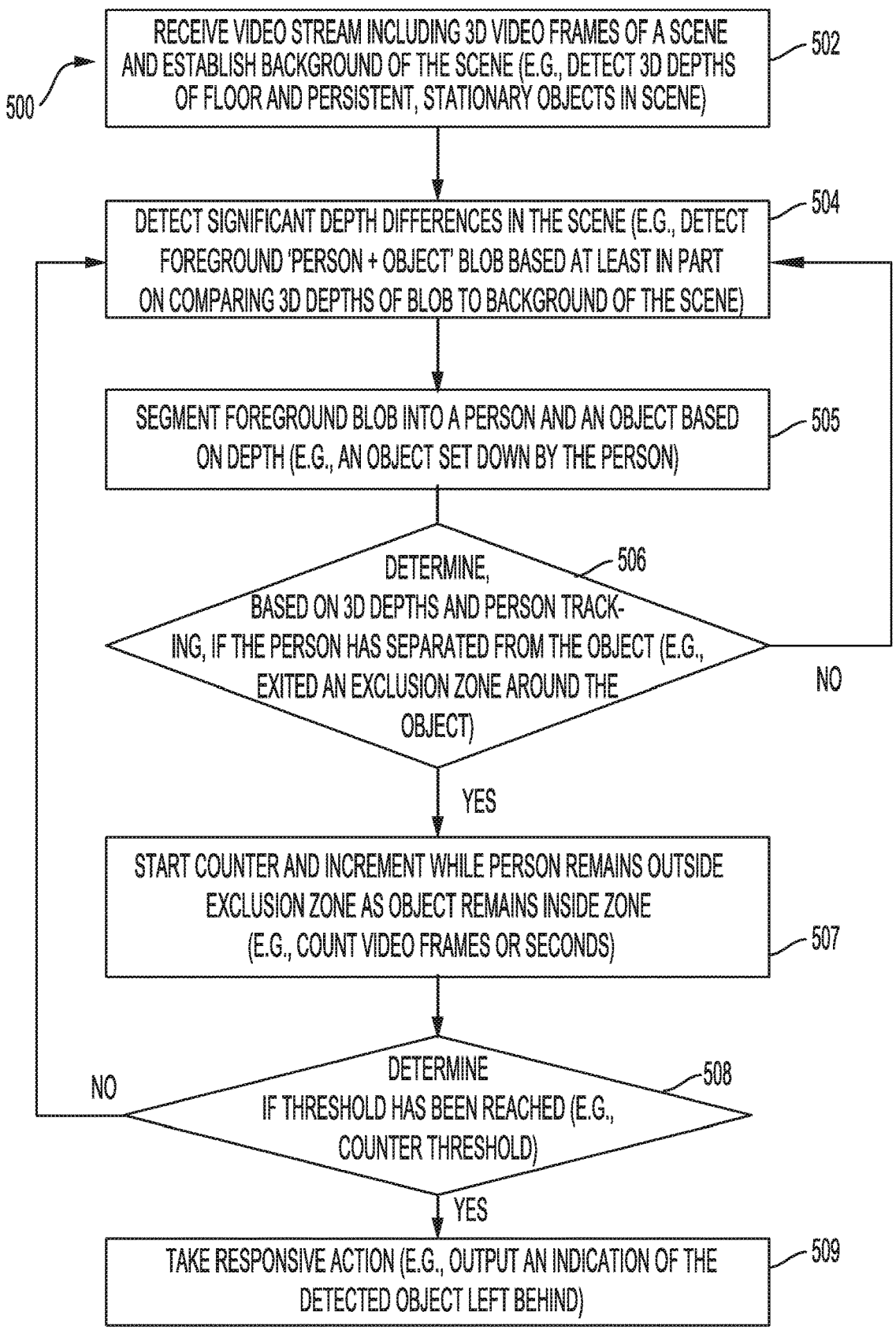
FIG. 5 is a process flow diagram illustrating an example of a process for detecting objects left behind based on depth information, according to examples of the present disclosure.

FIG. 5 depicts an example of an object left behind detection process 500 using depth data from 3D video frames and person tracking, according to examples of the present disclosure. The object left behind detection process 500 depicted in FIG. 5 is described with continued reference to the implementations of FIGS. 1-4. However, the object left behind detection process 500 is not limited to those examples of implementations. The operations shown in FIG. 5 depict examples of steps that make use of the depth data from received 3D video frames to determine that an object has been left behind by a person in a scene (for example, a location that is being monitored by a 3D camera).

The object left behind detection process 500 may, for example, be implemented by components of the systems and environments of FIGS. 1 and 2. In particular, the example of an object left behind detection process 500 may be implemented by the object identification server 102 of FIG. 1 and its video analysis subsystem 104, background segmentation module 106, object detection module 107, and person tracking module 108. In various embodiments, the exemplary object left behind detection process 500 can be performed by one or more processors of a computing device executing instructions to perform one or more of the following operations.

As shown in FIG. 5 and explained in detail below, the exemplary object left behind detection process 500 can automatically analyze 3D frames or images to determine that a person has left behind an object by: establishing a background of a scene (for example, a location being monitored or surveilled with a 3D camera) based on the 3D depths from the 3D camera of the background objects and background surfaces (for example, the floor 320) at 502; detecting, based on 3D depths captured by the 3D camera, a foreground person(s)/object(s) based on a new significant depth difference in the scene (for example, detecting a new foreground blob in the scene that is not part of (is a different than) the background) at 504; accurately segmenting, for example, based on depth differences, the foreground blob into a person and an object that has volume (for example, a height) at 505; determining, based on person tracking that the person has let go of or separated from the object (for example, the person left an exclusion zone) at 506; and determining, based on person tracking, that the person has left the object behind at the scene for a measured amount of time (duration) at 507 and 508. If the person is separated from the object (for example, is outside the exclusion zone) for a predetermined threshold (for example, a specified amount of time such as a threshold duration), then the object left behind detection process 500 can take an action to address or deal with the object that has been left behind, such as outputting an indication (for example, an alert to a human system operator) that the object has been left behind at 509.

Looking now at each operation in more detail, at 502, the illustrated example of an object left behind detection process 500 begins with receiving a video stream including 3D video frames of a scene and analyzing these frames to establish a background of the scene. In various implementations, the scene may be a location being monitored or surveilled with a 3D camera (for example, the 3D camera 120 or 220 discussed above with reference to FIGS. 1 and 2). In the example of FIG. 5, operation 502 can establish a background of the scene by detecting, measuring, establishing, determining and/or recording the 3D depths of the floor of the scene and of the persistent, stationary objects present in the scene. For instance, operation 502 can determine a 3D depth of 10 feet for the floor of a room being surveilled where the depth is measured from or relative to a ceiling mounted 3D camera (for example, the floor 320 shown in FIGS. 3 and 4), and can similarly determine the 3D depths of counter tops, table tops, desktops, and shelves that are in the room as part of establishing the background of the scene. In this example, surfaces of the persistent, stationary counters, tables, and shelves surfaces may have 3D depths indicating they are 3 to 4 feet higher than the 3D depth of the floor 320 (i.e., 3 to 4 feet closer to the 3D camera than the floor 320).

Next, at 504, based on the 3D depths captured by the 3D camera for the background objects, that frames are analyzed to determine or detect any significant depth differences in a frame, compared to the expected background depth at a given location in the scene. As shown, operation 504 can include detecting a new foreground blob in the scene (for example, a blob that is not part of the background) by comparing a 3D depth of the foreground blob to the 3D depth for that portion of the background, which was established at 502. In the example of FIG. 5, the detected foreground blob can be a 'person plus object' blob that includes a person and an object associated with the person, such as a shopping bag object that the person is holding. In various implementations, the difference detected at 504 can be the depth information associated with a foreground object that has volume (for example, a measurable depth) and that is a new object introduced to the scene (for example, an object that is not in or part of the background established at 502, based on the object's depth).

In the case where a 'person plus object blob' is detected at 504, this new foreground object can include a person (for example, person 116, 216-2) that appears in frames of a 3D video stream and can also include one or more objects associated with, and currently indistinguishable from, the person (for example, an object 124, 224, or 324 that is carried by the person). The 3D video stream may include video frames of a person holding or carrying an object. As noted previously, each 3D frame or image in the video stream includes or is accompanied by information (such as, for example, meta data, video primitives 241, depth-representative colors in the frame or image, or the like) that indicates the distance of each portion (such as, for example, each pixel, group of pixels, area, or the like) of the 3D frame from the 3D camera. In some implementations, this distance information may be encoded or represented by the color of each portion of the frame. Thus, a person plus object blob may be identified, detected or segmented from the background based primarily on the depth (distance from the 3D camera) of the top of the person's head and/or the top of the person's shoulders. For instance, with reference to the example user interface of FIG. 3, a person plus object blob including the object 324 may be segmented from the floor 320 and the background based on the 3D depth of the top of the person's torso/shoulder 316 and/or the top of the person's head 318.

Then, at 505, the process 500 accurately segments the foreground blob into a person and an object that has volume, based on new depth information. As noted, the object may be an object carried or held by the person (such as, for example, a backpack, shopping bag, briefcase, laptop, mobile phone, etc.), such that the object is initially indistinguishable from the person based on depth information because the top of the carried object is close in distance to and/or blocked from camera view by the person's head and shoulders—i.e., the object is an unsegmented part of the person plus object blob. When the person sets the object down (for example, on the floor) the distance between the top of the person (for example, their head and shoulders) and the top of the object increases significantly (for example, by two feet or more), and this difference change (for example, different depth relative to the camera) is detected in the 3D images and used to segment the set-down object from the person. That is, this difference change can be used to detect that the foreground person plus object blob has separated into two or more blobs, where a first one of the two or more blobs is a person blob corresponding to the person and a second one of the two or more blobs is an object blob corresponding to the set-down object based on the person having a 3D depth that is different from the object. Additionally or alternatively, when the person sets the object down, this typically creates some space between the person and the object, which may be detected in the 3D images as a view of the floor (for example, depth information in a frame that matches the depth of the floor background), and this new view of the floor between the person and the set-down object may be used to segment the set-down object from the person.

According to various implementations, operation 505 includes using a 3D depth of the person (for example, the shoulders/torso 316 and the top of the head 318 of the person as shown in FIG. 3) and comparing that to a different 3D depth of an object set-down by the person (for example, the top of the object 324 of FIG. 3) in order to segment the initial person plus object blob into a person blob and a separate "set-down object" blob (i.e., object blob). In such implementations, operation 506 can include detecting or determining that a distance of a part or portion of the person plus object blob (for example, the portion that is the carried object) from the 3D camera has changed. For example, for an object included in the 'person plus object blob' where the person's head 318 is 3 feet from a ceiling mounted 3D camera, operation 505 can determine that the object 324 has been placed on the floor 320 in response to or based on the object 324 changing to being 7 feet from the 3D camera (i.e., the top of the object 324 being 2 feet higher than the floor 320 when it is set down on the floor).

In additional or alternative implementations, operation 505 may also detect when a foreground blob has shrunk significantly. These implementations handle cases where the object left behind is not in the FoV of the 3D camera. According to such implementations, detecting a reduced size of a foreground blob handles scenarios where the person has placed an object (for example, a box, phone, or laptop) under a table or in a receptacle (for example, a trash can, a desk drawer, or a file cabinet) outside the camera's FoV. Such implementations can set a size threshold on the foreground blob as part of operation 504, and detect size reductions of the foreground blob at operation 505 that fall outside the threshold. The threshold can be adjusted as needed to account for objects with insignificant sizes that disappear inside a person blob (for example, swallowed items of food or items placed in the person's pockets) or items that are placed inside a receptacle (for example, a cup of coffee thrown into a trash can).

In additional or alternative implementations, operation 505 may also include performing object recognition and computer vision tasks to segment the initial foreground blob into the person and the object. In yet other additional or alternative implementations, operation 505 can include determining that an object 324 is present in a scene for threshold amount of time. For example, after segmenting the 'person plus object' blob, operation 505 can include determining that the separate object is present in the scene for a certain duration or certain number of video frames (such as, for example, 5 seconds or an equivalent duration in terms of video frames based on an FPS rate of the 3D camera 120 or 220 used to capture the video frames).

In yet other additional or alternative implementations, operation 505 may further include recognizing object(s) and a person associated with object(s) in video frames received as part of a video stream from a 3D camera. In some such implementations, operation 505 can include recognizing objects and persons, based at least in part on performing person tracking and computer vision tasks. For instance, operation 505 may be performed in implemented in part by the video analysis subsystem 104, the object detection module 107, and the person tracking module 108 of the object identification server 102 of FIG. 1.

At 506, a determination is made as to whether, based on person tracking the person has separated from the object. As shown in the example of FIG. 5, in some implementations, operation 506 includes determining whether the person has exited or gone outside of an exclusion zone around the object. As shown, 506 can include basing the determination on person tracking (for example, head tracking of the person's head 318) and comparing the tracked location of the person to the boundaries of the exclusion zone. In some implementations, the exclusion zone can be defined as a radius around the object.

In certain implementations, person tracking can be done based on or using the tracked person's height. For example, the specific, measured 3D depth of a particular person's shoulders/torso 316 and head 318 can be used to differentiate that particular person from other persons in a group (for example, person 216-2 in a group of persons 216-1, 216-2, and 216-3 at the location 211 of FIG. 2) at the scene. Similarly, that person can be associated with a particular object (for example, object 224 of FIG. 2) that they set down (as determined per 505) based on the measured 3D depth of the person plus object blob. Then, head tracking, which may include head height tracking, can be used to track the particular person's head in order to determine that the particular person has separated from the object (for example, placed the object 224 down at the location 211).

If it is determined at 506 that the person has not separated from the object (for example, the person has not exited the exclusion zone), control is passed back to 504. Otherwise, if it is determined that the person has separated from the object (for example, moved sufficiently far away from the object or exited the exclusion zone), control is passed to 507 where a counter is started.

At 507, the counter is incremented while the person remains outside the exclusion zone as the object remains inside the exclusion zone. As shown, 507 can include counting video frames or seconds that elapse while the person is outside the exclusion zone. In certain implementations, operation 507 can include pausing or resetting a counter if the person re-enters the exclusion zone. That is, if the tracked person re-enters the exclusion zone containing the object, the process 500 can conclude that the object may not be abandoned, at least while the tracked person remains in the exclusion zone.

Next, at 508, a determination is made, based on continued person tracking, that the person has left the object behind at the scene for a threshold. In some implementations, the threshold can be a predetermined amount of time. In alternative or additional implementations, the threshold can be a predetermined distance between the person and the object, or a combination of time and distance. In the example of FIG. 5, 508 can include determining whether a predetermined threshold amount of time for the person remaining outside the exclusion zone has been reached or not. In some implementations, operation 508 can include determining that the person has remained outside the exclusion zone for a threshold amount of time that is represented in terms of the counter incremented at 507. If it is determined that the person has not yet remained outside the exclusion zone for the threshold amount of time, control is passed back to 504 to analyze the next 3D video frame. For example, additional video frames may be analyzed to determine that the person has re-entered the exclusion zone before the threshold has been reached. Otherwise, if it is determined that the person has remained outside the exclusion zone for the threshold amount of time (for example, in terms of a predetermined number of seconds, minutes, or the like, or the equivalent number of video frames), control is passed to 509, where an action is initiated to address or deal with the object that has been left behind.

Then, at 509, after the person remains outside the exclusion zone for a threshold duration, the object left behind detection process 500 can take responsive action, such as outputting an indication (for example, an alert) that the object has been left behind, for example, to a human operator who can investigate the abandoned object. In an implementation, 509 can include displaying, on a display device, an OBJECT LEFT BEHIND visual alert as shown in the information 430 displayed on the user interface of FIG. 4. In additional or alternative implementations, 509 can include activating a visual and/or audio alarm system at the monitored location; activating a silent alarm; activating a rapid response mechanism; locking a door; contacting a security service; and/or forwarding data (such as, for example, 3D image data, 3D video data, video primitives; and/or analyzed data) to another computer system via a network, such as, but not limited to, the Internet or the networks 115 and 215 of FIG. 1.

FIG. 6 shows a block diagram of an example of a client device 618. In the example of FIG. 6, the client device 618 is a computing system configured to be installed at a site to be monitored (for example, the location 211 of FIG. 2). The client device 618 may include an enclosure that may be mounted to a ceiling or wall (for example, a corner of a room at a monitored site), or a kiosk that may physically be installed at a site being monitored. To provide the functionality as further described herein, the client device 618 may include an operating system 612, which may be any type of suitable operating system or platform including a specialized operating system. In addition, the operating system 612 may include a kernel 613. The kernel 613 may handle various lower-level functions of the operating system 612 such as process, memory, and peripheral management. The kernel 613 may operate in a secure environment. For example, the kernel 613 may be stored in a secure memory (for example, not accessible by the application 619), and operate within a kernel space, whereas the application 619 may operate within an application/user space.

The API 615 (Application Programming Interface) may include a set of protocols including routines, data structures, object classes, libraries, variables, etc. that provide a defined method of communication between the application 619 and components of the client device 618 including various peripherals 620. For example, an operation performed by the application 619 that requires communication with or access to one or more peripherals 620 of client device 618 may only be available to the application 619 via the API 615. In another example, the application 619 may only be allowed to process information related to a video stream captured by a 3D camera 622 included in the peripherals 620 (for example, 3D video frames captured at a site where the client device 618 is installed) via the API 615.

As shown in FIG. 6, the application 619 may include an image capture application and/or a surveillance application. In one implementation, the API 618 may be provided (for example, developed) by a security entity, which may be associated with the client device 618. In an example, the application 619 is a surveillance application for monitoring a location. That is, the application 619 may use the 3D camera 622 to capture 3D images (for example, 3D video frames) and associated distance-from-camera information.

The peripheral(s) 620 may include components (for example, I/O components) of the client device 618, some or all of which provide a user interface to the client device 618. In the example of FIG. 6 where the client device 618 is implemented as a ceiling mounted device, peripherals 620 may include site-specific peripherals, which are components that are typically not found on other types of devices (for example, peripherals and sensors for ceiling-mounted surveillance devices such as, for instance, integrated motion detectors, smoke detectors, and the like). The peripherals 620 may include a communications interface 621 (which may include wireless and wired communications interfaces), the 3D camera 622, and a GPS component 623 (or GPS data store). In some implementations, the communications interface 621 can include wired interfaces for the 3D camera 622, such as, for example, a firewire digital camera interface or a USB interface. According to various implementations, the client device 618 and its 3D camera 622 may not be attached as a peripheral to a computer. In such implementations, the 3D camera 622 may be a separate, addressable entity on an Ethernet-based or WLAN network.

In addition, the peripherals 620 may also include various other peripherals 626 such as additional sensors, a biometric reader, a touch screen that implements a graphical user interface, multicolor LEDs that indicate the status of the client device 618 (for example red LEDs to indicate that the 3D camera 622 is recording/active), a keypad, a USB key reader, and various other I/O (input/output) components.

Figure 7:
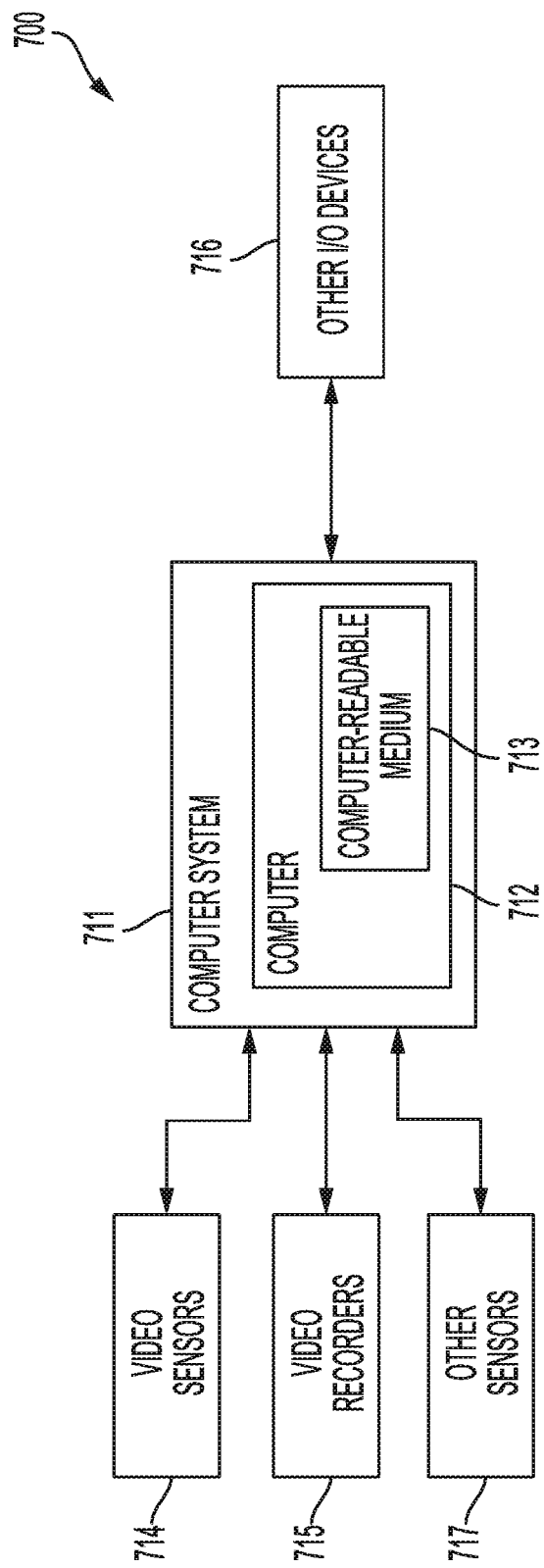
FIG. 7 illustrates a block diagram of a video surveillance system that may be used in conjunction with one or more implementations.

FIG. 7 illustrates a block diagram of a video surveillance system for detecting objects left behind, according to examples of the present disclosure. In particular, FIG. 7 illustrates a block diagram of the video surveillance system 700 usable to detect objects left behind. As shown, a computer system 711 comprises a computer 712 having a computer-readable medium 713 embodying software to operate the computer 712 according to some implementations. The computer system 711 is coupled to one or more 3D video sensors 714, one or more video recorders 715, and 30 one or more other input/output (I/O) devices 716. The video sensors 714 can also be optionally coupled to the video recorders 715 for direct recording of 3D video surveillance data. The computer system is optionally coupled to other sensors 717.

The 3D video sensors 714 provide source 3D video to the computer system 711. Each 3D video sensor 714 can be coupled to the computer system 711 using, for example, a direct connection (for example, a firewire digital camera interface) or a network. The 3D video sensors 714 can be installed in busy environments, such as, for example, an airport, concert venue, transit station, financial institution, or sports venue (for example, stadium). Examples of a 3D video sensor 714 include: a 3D video camera; a digital 3D video camera; a 3D webcam; an infrared 3D video camera; and a 3D CCTV camera. Such video sensors can be ceiling-mounted or wall-mounted 3D cameras.

The video recorders 715 receive 3D video surveillance data from the computer system 711 for recording and/or provide source video to the computer system 711. Each video recorder 715 can be coupled to the computer system 711 using, for example, a direct connection or a network. The video recorders can be installed at busy location in some implementations. The video surveillance system in the computer system 711 may control when and with what quality setting a video recorder 715 records video. Examples of a video recorder 715 can include one or more of a video tape recorder, a digital video recorder, a video disk, a DVD, and a computer-readable medium.

The other I/O devices 716 provide input to and receive output from the computer system 711. The other I/O devices 716 can be used to task the computer system 711 and produce reports from the computer system 711. The other I/O devices 716 include non-video/image capturing I/O devices. Examples of other I/O devices 716 include a keyboard, a mouse, a trackpad, a stylus, a pointing device, a monitor, a touchscreen, a microphone, a printer, another computer system, a network, and an alarm.

The other sensors 717 provide additional input to the computer system 711. Each other sensor 717 can be coupled to the computer system 711 using, for example, a direct connection or a network. The other sensors 717 can exist prior to installation of the implementation shown in FIG. 7 or can be installed at busy environments. Examples of another sensor 717 include, but are not limited to, a motion sensor, an optical tripwire, a biometric sensor, an RFID sensor, and a card-based or keypad-based authorization system. The outputs of the other sensors 717 can be recorded by the computer system 711, recording devices, and/or recording systems.

Figure 8:
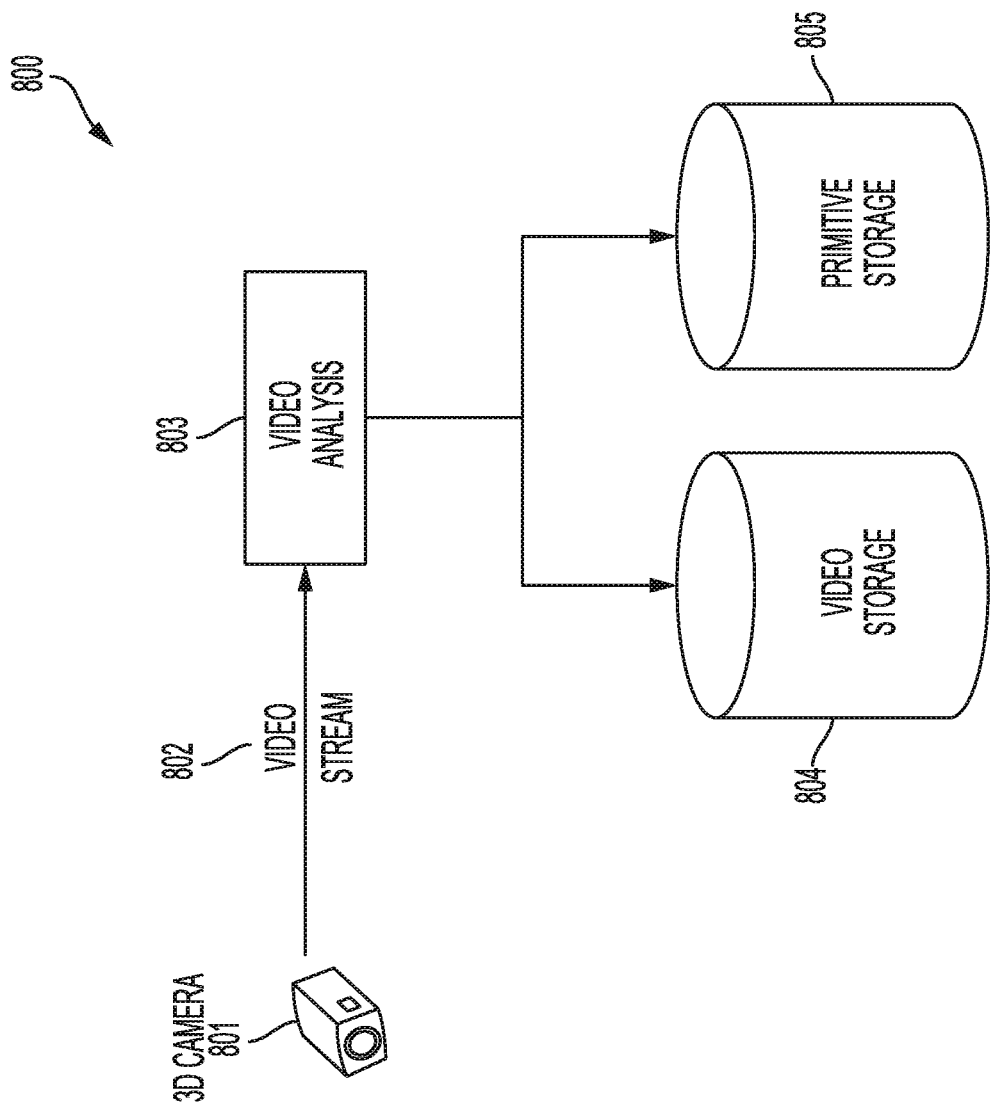
FIG. 8 shows a block diagram of an example of a video analysis subsystem that may be used in conjunction with one or more implementations.

FIG. 8 shows a block diagram of a video analysis subsystem 803 within a video surveillance system 800, consistent with implementations. In particular, FIG. 8 shows a video analysis portion (for example, the video analysis subsystem 803) of the video surveillance system 800. In FIG. 8, a 3D video sensor 801 may capture a video stream 802 that is provided to a video analysis subsystem 803. In the non-limiting example of FIG. 8, the video sensor 801 is a 3D video camera. The video analysis subsystem 803 may then perform analysis of the video stream 802 to derive video primitives, which may be stored in primitive storage 805. The video analysis subsystem 803 may further control storage of all or portions of the video stream 802 in video storage 804, for example, a certain quality and/or certain quantity of 3D video needed to detect objects left behind. Although the primitive storage 805 and the video storage 804 are depicted as being separate computer readable media in the non-limiting example of FIG. 8, it is to be understood that the primitive storage 805 and the video storage 804 need not be each on separate media but may instead be on a single computer readable medium.

With continued reference to FIG. 8, once the video, and, if there are other sensors, the non-video primitives are available; the subsystem 803 may detect events. A user can task the subsystem 803 by defining rules and corresponding responses using a rule and response definition interface. The rules can be translated into event discriminators, and the system 800 extracts corresponding event occurrences. The detected event occurrences can then trigger user-defined responses.

A response may include retrieving and displaying a snapshot of a video or video frame of the detected event from video storage 804. The video storage 804 may be part of the video surveillance system 700 discussed above with reference to FIG. 7, or it may be a separate recording device. Non-limiting examples of a response may include, but are not necessarily limited to, the following: activating a visual and/or audio alert on a system display (see, for example, the OBJECT LEFT BEHIND visual alert in information 430 of the user interface of FIG. 4); activating a visual and/or audio alarm system at the location; activating a silent alarm; activating a rapid response mechanism; locking a door; contacting a security service; forwarding data (such as, for example, 3D image data, 3D video data, video primitives; and/or analyzed data) to another computer system via a network, such as, but not limited to, the Internet or the networks 115 and 215 of FIGS. 1 and 2; saving such data to a designated computer-readable medium; activating some other sensor or surveillance system; tasking the computer system 711 described above with reference to FIG. 7 and/or another computer system; and/or directing the computer system 711 of FIG. 7 and/or another computer system (see, for example, computing system 900 of FIG. 9, described below). The primitive data can be thought of as data stored in a database. To detect event occurrences (such as, for example, a person dropping an object on the floor, a person placing an object on a surface such as a table or floor, a person abandoning an object, a person leaving an exclusion zone or area) in it, an efficient query language may be required. Certain implementations may include an activity inferencing language.

Certain implementations can be performed using a computer program or set of programs. The computer programs can exist in a variety of forms both active and inactive. For example, the computer programs can exist as software program(s) comprised of program instructions in source code, object code, executable code or other formats, firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

Figure 9:
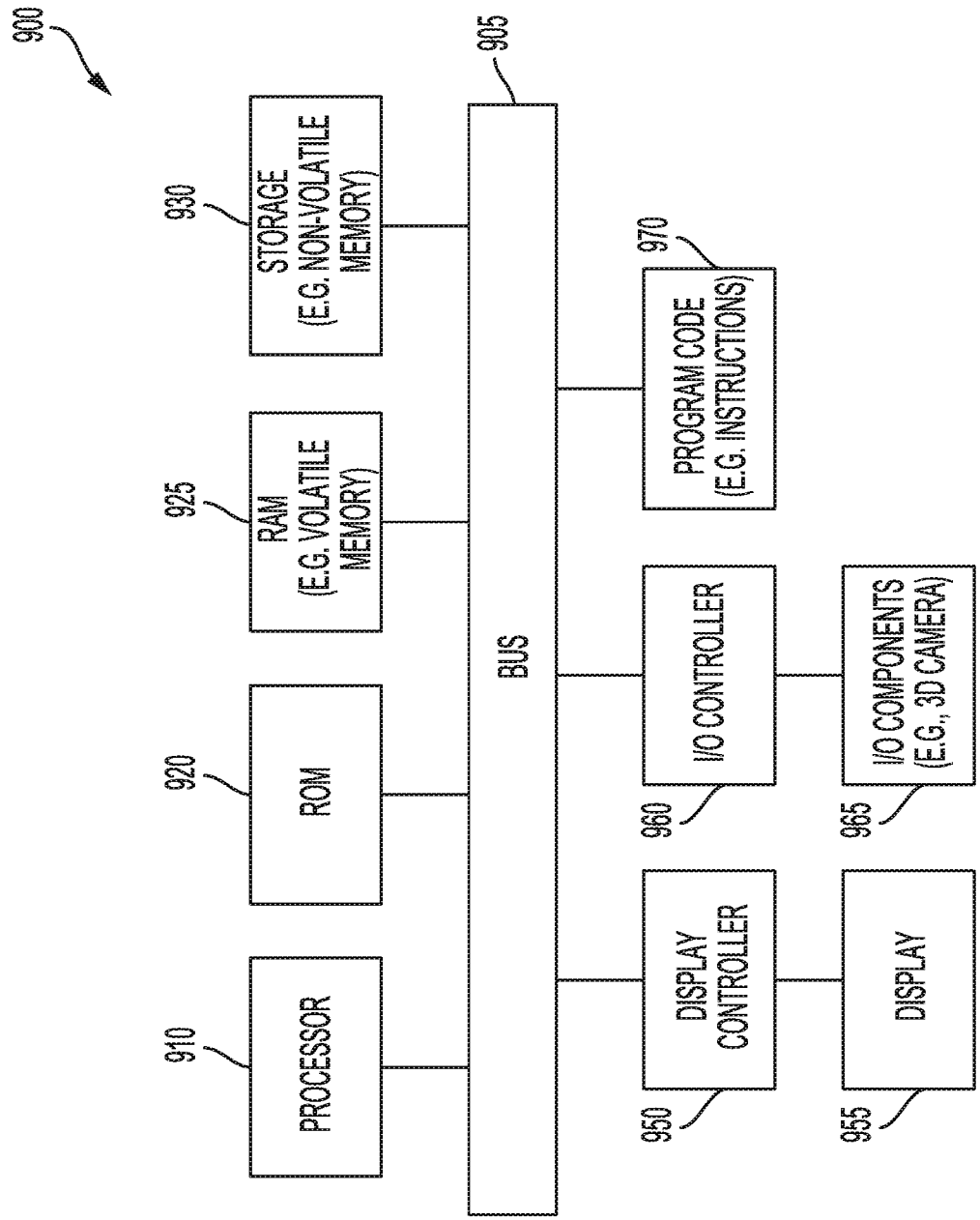
FIG. 9 is a block diagram illustrating an example of a computing system that may be used in conjunction with one or more implementations.

FIG. 9 shows a block diagram of an example of a computing system 900 that may be used in conjunction with one or more implementations. For example, computing system 900 (or system, or server, or computing device, or device) may represent any of the devices or systems described herein that perform any of the processes, operations, or methods of the disclosure (for example, the systems and environments of FIGS. 1 and 2 and the object left behind detection process 500 shown in FIG. 5). In some implementations, the computing system 900 can host the data management platform described above. Note that while the computing system 900 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 900 may include a bus 905 which may be coupled to a processor 910, ROM (Read Only Memory) 920, RAM (or volatile memory) 925, and storage (or non-volatile memory) 930. The processor 910 may retrieve stored instructions from one or more of the memories 920, 925, and 930 and execute the instructions to perform processes, operations, or methods described herein. These memories represent examples of a non-transitory computer-readable medium (or machine-readable medium, or storage) containing instructions which when executed by a processor (or system, or computing system), cause the processor to perform operations, processes, or methods described herein. The RAM 925 may be implemented as, for example, dynamic RAM (DRAM), or other types of memory that require power continually in order to refresh or maintain the data in the memory. Storage 930 may include, for example, magnetic, semiconductor, tape, optical, removable, non-removable, and other types of storage that maintain data even after power is removed from the system. It should be appreciated that storage 930 may be remote from the system (for example, accessible via a network).

A display controller 950 may be coupled to the bus 905 in order to receive display data to be displayed on a display device 955, which can display any one of the user interface features or implementations described herein and may be a local or a remote display device. For example, the display device 955 can display the user interfaces 300 and 400 of FIGS. 3 and 4. The computing system 900 may also include one or more input/output (I/O) components 965 including a 3D camera, a microphone, mice, keyboards, touch screen, network interfaces, printers, speakers, and other devices. Typically, the input/output components 965 are coupled to the system through an input/output controller 960.

Program code 970 (or modules, instructions, components, subsystems, units, functions, or logic) may represent any of the instructions, operations, subsystems, or engines as described herein. Program code 970 may reside, completely or at least partially, within the memories described above (for example, non-transitory computer-readable media), or within a processor during execution thereof by the computing system. In addition, program code 970 can be implemented as software, firmware, or functional circuitry within the computing system, or as combinations thereof. In some implementations, program code 970 can be located in a functional form on computer-readable media (for example, one or more of the memories 920, 925, and 930) that is selectively removable and can be loaded onto or transferred to the computing system 900 for execution by the processor 910. The program code 970 and computer-readable media can form a computer program product in these illustrative examples.

Moreover, any of the disclosed implementations may be embodied in various types of hardware, software, firmware, and combinations thereof. For example, some techniques disclosed herein may be implemented, at least in part, by non-transitory computer-readable media that include program instructions, state information, etc., for performing various methods and operations described herein. Examples of program instructions include both machine code, such as produced by a compiler, and files containing higher-level or intermediate code that may be executed by a computing device such as a server or other data processing apparatus (or machine) using an interpreter.

It should be noted that the term "approximately" or "substantially" may be used herein and may be interpreted as "as nearly as practicable," "within technical limitations," and the like. In addition, the use of the term "or" indicates an inclusive or (for example, and/or) unless otherwise specified.

It will be understood that when an element is herein referred to as being "connected", "in communication with" or "coupled" to another element, it can be directly connected, directly in communication with or directly coupled to the other element or intervening elements may be present. In contrast, when an element is herein referred to as being "directly connected", "directly in communication with" or "directly coupled" to another element, there are no intervening elements present. Other words used to describe the relationship between elements should be interpreted in a like fashion (i.e., "between" versus "directly between", "adjacent" versus "directly adjacent", etc.).

While the present teachings have been described with reference to the exemplary implementations thereof, those skilled in the art will be able to make various modifications to the described examples without departing from the true spirit and scope. That is, other implementations will be apparent to those skilled in the art from consideration of the specification and practice of the embodiments disclosed herein. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims, the claims of the corresponding non-provisional application, and their equivalents.

What is claimed is:

1. A computer implemented method for automated detection of objects that have been left behind, the method comprising:
   receiving, at a 3D image processing device, a plurality of 3D video frames of a scene from a three-dimensional (3D) camera, each 3D video frame including 3D depth information for each pixel in the 3D video frame;
   establishing, by a background segmentation module of the 3D image processing device, and based on the 3D depths information from the plurality of 3D video frames, a background of the scene;
   detecting, by an object detection module of the 3D image processing device, in the plurality of 3D video frames and by the computing device, a foreground blob in the scene based on the foreground blob having a 3D depth from the 3D depth information that is different from the 3D depth information of the established background;
   subsequently first detecting, by the object detection module of the 3D image processing device, that the foreground blob has separated into at least two foreground blobs in 3D space relative to the established background in the plurality of 3D video frames;
   determining that a first foreground blob of the at least two foreground blobs corresponds to a person and a second foreground blob of the at least two foreground blobs corresponds to an object; and
   subsequently second detecting, by the 3D image processing device using the 3D depth information, that the first foreground blob corresponding to the person has relatively changed in 3D depth relative to the second foreground blob corresponding to the object by a minimum threshold distance and for a minimum threshold time; and
   responsive to the first detecting and the second detecting: generating an alert indicating that the object has been left behind.

2. The method of claim 1, further comprising, causing, by the 3D image processing device, the alert to be displayed on a display device.

3. The method of claim 1, wherein determining that the person has been separated from the object for the minimum threshold time includes:
   incrementing a timer;
   determining that the timer has reached a threshold time value; and
   in response to determining that the timer has reached the threshold, generating the alert indicating that the object has been left behind.

4. The method of claim 3, wherein the threshold time value is a tunable numeric value representing a duration in seconds with a default value of 10.

5. The method of claim 1, wherein establishing the background of the scene includes recording respective 3D depths of a floor present in the scene and at least one persistent, stationary object present in the scene.

6. The method of claim 5, wherein the foreground blob is a person plus object blob that has one or more 3D depths from the 3D depth information that are different than the 3D depth from the 3D depth information of the floor and the 3D depth from the 3D depth information of the at least one persistent, stationary object present in the scene.

7. The method of claim 1, wherein determining that the minimum threshold distance has been met comprises:
   defining, using the 3D depth information, a 3D exclusion zone around the object and within the scene; and
   determining, by a person tracking module of the 3D image processing device, based at least in part on a person tracking of the first foreground blob, that the person has left the defined 3D exclusion zone.

8. The method of claim 7, wherein the exclusion zone is a dynamically re-sizable area defined as a 3D radius around the object.

9. The method of claim 8, wherein the 3D radius is a tunable numeric value representing a distance in feet with a default value of 5.

10. The method of claim 1, further comprising determining, by the computing device, whether the object has been dropped versus being placed down, and responsively displaying, on a display device, the alert only when the determination is that the object has been dropped.

11. The method of claim 7, wherein the 3D exclusion zone is varied in size as a function of one or more of a determined density of a crowd within the scene and a determined security threat level associated with the scene.

12. The method of claim 1, wherein one or both of the minimum threshold distance and the minimum threshold time is set by the 3D image processing device accessing a trained machine learning model trained with 3D video of objects being left behind and not being left behind and captured at a same site as the scene.

13. The method of claim 1, further comprising averaging 3D pixel depths from the 3D depth information across the plurality of video frames in establishing the background of the scene.

14. The method of claim 1, further comprising calculating, by the 3D image processing device, a size of the second foreground blob, comparing the size to a stored minimum threshold left behind object size, and generating the alert only if the size of the second foreground blob exceeds the minimum threshold left behind object size.

15. A system for automatically detecting objects that have been left behind, the system comprising:
   one or more three-dimensional (3D) cameras;
   one or more processors; and
   a memory operably coupled to the one or more processors, the memory storing instructions, which when executed by the one or more processors, cause the one or more processors to perform operations comprising:
      receiving a plurality of 3D video frames of a scene from a first one of the one or more 3D cameras, each 3D video frame including 3D depth information for each pixel in the 3D video frame;
      establishing, by a background segmentation module of a 3D image processor of the one or more processors, and based on the 3D depths information from the plurality of 3D video frames, a background of the scene;
      detecting, by an object detection module of the 3D image processor of the one or more processors, in the plurality of 3D video frames, a foreground blob in the scene based on the foreground blob having a 3D depth from the 3D depth information that is different from the 3D depth information of the established background;
      subsequently first detecting, by the object detection module of the 3D image processor of the one or more processors, that the foreground blob has separated into at least two foreground blobs in 3D space relative to the established background in the plurality of 3D video frames;
      determining, by the one or more processors, that a first foreground blob of the at least two foreground blobs corresponds to a person and a second foreground blob of the at least two foreground blobs corresponds to an object;
   subsequently second detecting, by the 3D image processor of the one or more processors using the 3D depth information, that the first foreground blob corresponding to the person has relatively changed in 3D depth relative to the second foreground blob corresponding to the object by a minimum threshold distance and for a minimum threshold time; and
   responsive to the first detecting and the second detecting: generating an alert indicating that the object has been left behind.

16. The system of claim 15, further comprising a display device, the operations further comprising:
   causing the alert to be displayed on the display device.

17. The system of claim 15, wherein establishing the background of the scene includes recording respective 3D depths of a floor present in the scene and at least one persistent, stationary object present in the scene.

18. The system of claim 17, wherein the foreground blob is a person plus object blob that has one or more 3D depths from the 3D depth information that are different than the 3D depth from the 3D depth information of the floor and the 3D depth from the 3D depth information of the at least one persistent, stationary object present in the scene.

19. A non-transitory computer-readable medium storing instructions which, when executed by one or more processors of a system, cause the system to perform operations comprising:
   receiving a plurality of 3D video frames of a scene from a three-dimensional (3D) camera, each 3D video frame including 3D depth information for each pixel in the 3D video frame;
   establishing, by a background segmentation module of a 3D image processor of the one or more processors, and based on the 3D depth information from the plurality of 3D video frames, a background of the scene;
   detecting, by an object detection module of the 3D image processor of the one or more processors, in the plurality of 3D video frames, a foreground blob in the scene based on the foreground blob having a 3D depth from the 3D depth information that is different from the 3D depth information of the established background;
   subsequently first detecting, by the object detection module of the 3D image processor of the one or more processors, that the foreground blob has separated into at least two foreground blobs in 3D space relative to the established background in the plurality of 3D video frames;
   determining that a first foreground blob of the at least two foreground blobs corresponds to a person and a second foreground blob of the at least two foreground blobs corresponds to an object;
   subsequently second detecting, by the 3D image processor of the one or more processors using the 3D depth information, that the first foreground blob corresponding to the person has relatively changed in 3D depth relative to the second foreground blob corresponding to the object by a minimum threshold distance and for a minimum threshold time; and
   responsive to the first detecting and the second detecting: generating an alert indicating that the object has been left behind.

* * * * *